US012563418B2

(12) United States Patent
Murgai et al.

(10) Patent No.: US 12,563,418 B2
(45) Date of Patent: Feb. 24, 2026

(54) EMBEDDING NEURAL NETWORKS AS A MATRIX FOR NETWORK DEVICE IN WIRELESS NETWORK

(71) Applicant: Samsung Electronics Co., Ltd., Suwon-si (KR)

(72) Inventors: Vishal Murgai, Karnataka (IN); Swaraj Kumar, Karnataka (IN); Sukhdeep Singh, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 18/348,039

(22) Filed: Jul. 6, 2023

(65) Prior Publication Data

US 2024/0007874 A1      Jan. 4, 2024

Related U.S. Application Data

(63) Continuation of application No. PCT/KR2023/009101, filed on Jun. 29, 2023.

(30) Foreign Application Priority Data

Jul. 1, 2022      (IN) .............................. 202241037937
Apr. 13, 2023      (IN) .............................. 202241037937

(51) Int. Cl.
*H04W 24/02*      (2009.01)
(52) U.S. Cl.
CPC .................................... *H04W 24/02* (2013.01)
(58) Field of Classification Search
CPC ..... H04W 24/02; H04L 41/0836; H04L 41/16
See application file for complete search history.

(56) References Cited

U.S. PATENT DOCUMENTS

| 11,190,425 | B2 | 11/2021 | Padfield et al. |
| 11,301,288 | B2 | 4/2022 | Albasheir |
| 2020/0382361 | A1 | 12/2020 | Chandrasekhar et al. |
| 2021/0185117 | A1 | 6/2021 | Tapia |

(Continued)

FOREIGN PATENT DOCUMENTS

| EP | 3961986 | 3/2022 |
| JP | 7083130 | 6/2022 |

(Continued)

OTHER PUBLICATIONS

Search Report and Written Opinion dated Oct. 6, 2023 issued in International Patent Application No. PCT/KR2023/009101.

(Continued)

*Primary Examiner* — Afshawn M Towfighi
(74) *Attorney, Agent, or Firm* — NIXON & VANDERHYE P.C.

(57)      ABSTRACT

Embodiments herein disclose a method and a device for embedding neural networks as a matrix for a network device in wireless networks. The method includes receiving s from the network device. Further, the method also includes determining the KPI among the plurality of KPIs as target KPIs that related to a network anomaly using a ML model. Further, the method also includes determining a correlation of the target KPI with the plurality of KPIs for the network anomaly using the ML model. Further, the method also includes determining the matrix indicating a relation of the target KPI with the plurality of KPIs. Furthermore, the method includes optimizing a resource of the network device by embedding the matrix in the network device.

15 Claims, 23 Drawing Sheets

(56) References Cited

U.S. PATENT DOCUMENTS

| | | | | |
|---|---|---|---|---|
| 2022/0014963 A1* | 1/2022 | Yeh | .................... | H04W 28/0268 |
| 2022/0131625 A1* | 4/2022 | Garcia | .................... | G06N 3/044 |
| 2022/0182291 A1* | 6/2022 | Doshi | ................. | H04L 41/5009 |
| 2023/0177558 A1* | 6/2023 | Reppen | .............. | G06Q 30/0242 |
| | | | | 705/14.41 |
| 2023/0327961 A1* | 10/2023 | Previti | ............... | H04L 41/0866 |
| | | | | 709/224 |
| 2024/0007363 A1* | 1/2024 | Jin | .......................... | H04L 41/16 |

FOREIGN PATENT DOCUMENTS

| | | |
|---|---|---|
| KR | 10-2021-0140901 | 11/2021 |
| WO | 2021/213247 | 10/2021 |
| WO | 2022/069036 | 4/2022 |

OTHER PUBLICATIONS

Extended European Search Report dated May 7, 2025 for EP Application No. 23831920.6.

"3rd Generation Partnership Project; Technical Specification Group Services and System Aspects; Management and orchestration; Study on Artificial Intelligence / Machine Learning (AI/ML) management (Release 18)", 3GPP Standard; Technical Report; 3GPP TS 28.908, 3rd Generation Partnership Project (3GPP), Mobile Competence Centre ; 650, Route Des Lucioles ; F-06921 Sophia-Antipolis Cedex ; France No. V0.2.0 Jun. 2, 2022 (Jun. 2, 2022), pp. 1-9, XP052182676, Retrieved from the Internet: https://www.3gpp.org/ftp/Specs/archive/28_series/28.908/28908-020.zip 28908-020.docx.

* cited by examiner (RELATED ART)

FIG. 4

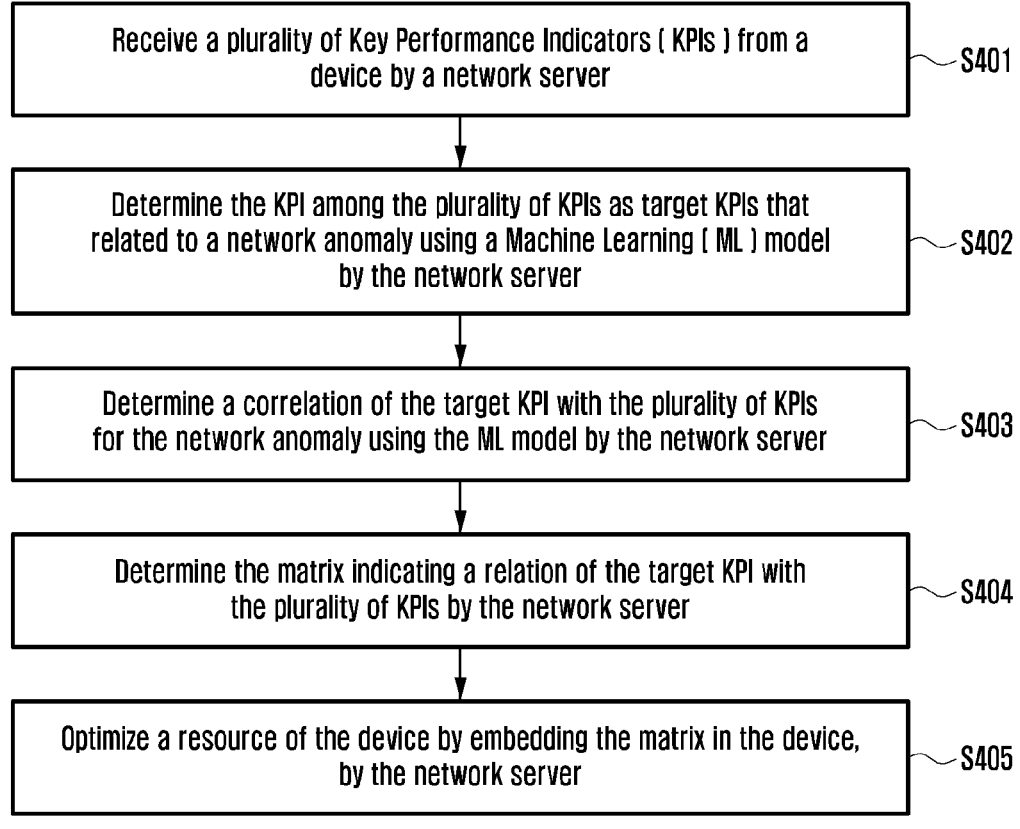

Receive a plurality of Key Performance Indicators ( KPIs ) from a device by a network server — S401

Determine the KPI among the plurality of KPIs as target KPIs that related to a network anomaly using a Machine Learning ( ML ) model by the network server — S402

Determine a correlation of the target KPI with the plurality of KPIs for the network anomaly using the ML model by the network server — S403

Determine the matrix indicating a relation of the target KPI with the plurality of KPIs by the network server — S404

Optimize a resource of the device by embedding the matrix in the device, by the network server — S405

FIG. 13

- Exponential
- Logarithmic
- Polynomial

EMBEDDING NEURAL NETWORKS AS A MATRIX FOR NETWORK DEVICE IN WIRELESS NETWORK

CROSS-REFERENCE TO RELATED APPLICATIONS

This application is a continuation of International Application No. PCT/KR2023/009101 designating the United States, filed on Jun. 29, 2023, in the Korean Intellectual Property Receiving Office and claiming priority to Indian Provisional Patent Application No. 202241037937, filed on Jul. 1, 2022, in the Indian Patent Office, and to Indian Complete patent application No. 202241037937, filed on Apr. 13, 2023, in the Indian Patent Office, the disclosures of all of which are incorporated by reference herein in their entireties.

BACKGROUND

Field

The disclosure relates to wireless networks, and for example, to a method and a device for embedding neural networks as a matrix for a network device in a wireless network.

Description of Related Art

Generally, troubleshooting a network anomaly is an essential part of wireless technologies to troubleshoot including, but not limited to, network congestion, network load imbalance, handover prediction issues and MAC scheduling issues.

In conventional systems and methods, a Machine Learning (ML) model is deployed on a central or edge cloud to detect and trouble shoot the network anomaly. Key Performance Indicators (KPI) of base stations are sent to the central or edge cloud. The central or edge cloud detects the network anomaly using the ML model based on the KPI of the base stations. The central or edge cloud generates an inference and sends the inference to the base stations based on the detected network anomaly. The base station applies the inference to troubleshoot the network anomaly. However in the conventional systems and methods, troubleshooting the network anomaly takes more time as the inference is generated in the central or edge cloud and sent from the central or edge cloud to the base stations. Further implementing the ML model in the base stations to generate the inference is not possible due to resource constraints in the base stations.

Thus, it is desired to address the above mentioned disadvantages or other shortcomings or at least provide a useful alternative.

SUMMARY

Embodiments of the disclosure provide a method and a device for embedding neural networks as a matrix for a network device in a wireless network.

Embodiments of the disclosure may determine a correlation of a target KPI with a plurality of KPIs for a network anomaly using an ML model and a matrix indicating a relation of the target KPI with the plurality of KPIs by a network server.

Embodiments of the disclosure may optimize a resource of the network device by embedding the matrix in the network device by the network server.

Embodiments of the disclosure may predict a future network anomaly based on the embedded matrix, which consumes curtail prediction time and reduces processing time for CPU, FLOPs and memory.

Accordingly, example embodiments herein disclose a method and a device for embedding neural networks as a matrix for a network device in wireless networks. The method includes receiving a plurality of KPIs from a network device. Further, the method also includes: determining the KPI among the plurality of KPIs as target KPIs that related to a network anomaly using a ML model, determining a correlation of the target KPI with the plurality of KPIs for the network anomaly using the ML model and determining a matrix indicating a relation of the target KPI with the plurality of KPIs. Furthermore, the method includes optimizing a resource of the network device by embedding the matrix in the network device.

In an example embodiment, the method further includes determining, by the network server, the matrix indicating a relation of the target KPI with the plurality of KPIs. Further the method also includes correlating, by the network server, the plurality of KPIs with the target KPI based on the network anomaly, transmitting, by the network server, the plurality of KPIs to an AI server for training. Furthermore, the method also includes receiving by the network server, the plurality of KPIs that is trained from the AI server.

According to an example embodiment, the matrix includes a KPI matrix and a coefficient matrix.

According to an example embodiment, the method includes determining memory requirements of the network device, computation requirements of the network device, flops of the network device, Random Access Memory (RAM) requirements, GPU requirements, CPU cycles and prediction time of the ML model of the network device.

According to an example embodiment, the prediction time of the ML model of the network device includes congestion prediction, handover prediction, MAC scheduling, call mute reduction and the like.

According to an example embodiment, optimizing, by the network server, the resource of the network device based on the matrix. Further, the method also includes sending, by the network server, a coefficient matrix to the network device. Furthermore, the method also includes embedding, by the network server, the coefficient matrix to the network device to optimize the resource of the network device.

According to an example embodiment, the method includes receiving, by the network server, the plurality of KPI from a network device. Further, the method also includes receiving a dataset includes the plurality of KPI from the network device, wherein the plurality of KPI are related to time-series data of the network device.

Accordingly, example embodiments herein disclose a method and a device for embedding neural networks as a matrix by a network device in the wireless networks. The method includes receiving a plurality of KPIs from the network device. Further, the method also includes determining the KPI among the plurality of KPIs as target KPIs that related to a network anomaly using a ML model, determining a correlation of the target KPI with the plurality of KPIs for the network anomaly using the ML model and determining a matrix indicating a relation of the target KPI with the plurality of KPIs. Furthermore, the method includes optimizing a resource of the network device by embedding the matrix in the network device.

Accordingly, example embodiments herein disclose a network server configured to embed neural networks as a matrix for network devices in a wireless network. The network server includes: a memory, a processor coupled to the memory, and an optimal resource controller coupled to the memory and the processor. The optimal resource controller is configured to receive the plurality of KPIs from the network device. The optimal resource controller is further configured to determine the KPI among the plurality of KPIs as target KPIs that related to the network anomaly using the ML model. The optimal resource controller is also configured to determine a correlation of the target KPI with the plurality of KPIs for the network anomaly using the ML model. The optimal resource controller is further configured to determine the matrix indicating a relation of the target KPI with the plurality of KPIs. The optimal resource controller is further configured to optimize the resource of the network device by embedding the matrix in the network device.

Accordingly, example embodiments herein disclose a network device configured to embed neural networks as a matrix in a wireless network. The network device includes: a memory, a processor coupled to the memory, and a network anomaly controller coupled to the memory and the processor. The network anomaly controller is configured to embed the matrix as the representation of the neural network to optimize the resource of the network device. The matrix indicates a relationship between the target KPI with the plurality of KPIs of the network device. The network anomaly controller is configured to predict the future network anomaly based on the embedded matrix.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure without departing from the disclosure, and the example embodiments herein include all such modifications.

BRIEF DESCRIPTION OF THE DRAWINGS

These and other features, aspects, features and advantages of present disclosure are illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which:

FIG. 4 is a flowchart illustrating an example method for embedding the neural networks as the matrix for the network device in the wireless network, according to various embodiments;

FIG. 13 is a block diagram illustrating an example configuration of a system for fed data to a meta RL system, according to various embodiments;

DETAILED DESCRIPTION

Figure 1:
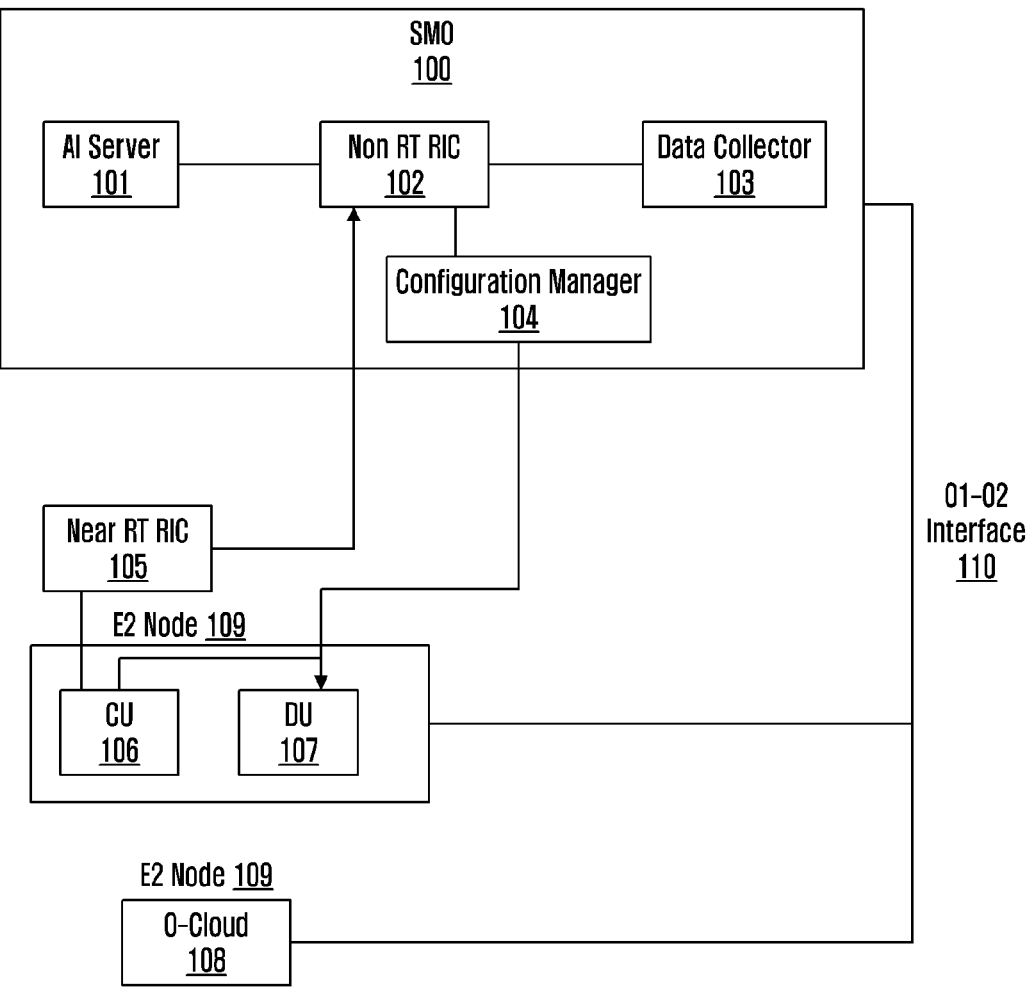
FIG. 1 is a diagram illustrating a high level overview of a system including Service Management Orchestration (SMO), according to the prior art.

The various example embodiments herein and the various features and advantageous details thereof are explained more fully with reference to the non-limiting example embodiments that are illustrated in the accompanying drawings and described herein. Descriptions of well-known components and processing techniques may be omitted so as to not unnecessarily obscure the embodiments with unnecessary detail. Also, the various embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Various embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. The block of the embodiments can be physically separated into two or morse interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally used to distinguish one element from another.

Accordingly, the embodiments herein disclose a method and a device for embedding neural networks as a matrix for a network device in wireless networks. The method includes receiving a plurality of KPIs from a network device. Further, the method also includes determining the KPI among the plurality of KPIs as target KPIs that related to a network anomaly using a ML model, determining a correlation of the target KPI with the plurality of KPIs for the network anomaly using the ML model and determining a matrix indicating a relation of the target KPI with the plurality of KPIs. Furthermore, the method includes optimizing a resource of the network device by embedding the matrix in the network device.

Accordingly, the embodiments herein disclose a method and a device for embedding neural networks as a matrix by a network device in the wireless networks. The method includes receiving a plurality of KPIs from the network device. Further, the method also includes determining the KPI among the plurality of KPIs as target KPIs that related to a network anomaly using a ML model, determining a correlation of the target KPI with the plurality of KPIs for the network anomaly using the ML model and determining a matrix indicating a relation of the target KPI with the plurality of KPIs. Furthermore, the method includes optimizing a resource of the network device by embedding the matrix in the network device.

Accordingly, the embodiments herein disclose a network server for embedding neural networks as a matrix for a network device in a wireless network. The network server includes a memory, a processor coupled to the memory, and an optimal resource controller coupled to the memory and the processor. The optimal resource controller is configured to receive the plurality of KPIs from the network device. The optimal resource controller is further configured to determine the KPI among the plurality of KPIs as target KPIs that related to the network anomaly using the ML model. The optimal resource controller is also configured to determine a correlation of the target KPI with the plurality of KPIs for the network anomaly using the ML model. The optimal resource controller is further configured to determine the matrix indicating a relation of the target KPI with the plurality of KPIs. The optimal resource controller is further configured to optimize the resource of the network device by embedding the matrix in the network device.

Accordingly, the embodiments herein disclose a network device for embedding neural networks as a matrix in a wireless network. The network device includes a memory, a processor coupled to the memory, and a network anomaly controller coupled to the memory and the processor. The network anomaly controller is configured to embed the matrix as the representation of the neural network to optimize the resource of the network device, wherein the matrix indicates a relationship between the target KPI with the plurality of KPIs of the network device. The network anomaly controller is configured to predict the future network anomaly based on the embedded matrix.

In conventional systems and methods, the ML model is deployed on the central or edge cloud to detect and trouble shoot the network anomaly. Key Performance Indicators (KPI) of base stations are sent to the central or edge cloud. The central or edge cloud detects the network anomaly using the ML model based on the KPI of the base stations. The central or edge cloud generates an inference and sends the inference to the base stations based on the detected network anomaly. The base station applies the inference to troubleshoot the network anomaly. However in the conventional systems and methods, troubleshooting the network anomaly takes more time as the inference is generated in the central or edge cloud and sent from the central or edge cloud to the base stations. Further implementing the ML model in the base stations to generate the inference is not possible due to resource constraints in the base stations.

Unlike to the conventional methods and system, the disclosed methods for deducing target KPIs from the dataset uses feature selection and correlation analysis. In the disclosed system, the KPI & coefficient matrices are derived for predicting the target KPI using previous time instances of correlated KPIs. The target KPI is arrived at the KPI and coefficient matrices using RL. An ultra-compact and efficient mechanism is used to realize ML on an embedded device. FLOPS and latency are reduced, while maintaining similar prediction accuracy as compared to traditional ML models. The KPI and coefficient matrices are encoded and sent from a Central Management Entity (CME) to the network device. The ML and NN models are represented as the coefficient matrices that can be efficiently realized on the network device to consume curtail prediction time, lower amount of CPU, FLOPs and memory.

FIG. 1 is a diagram illustrating a high level overview of the system including Service Management Orchestration (SMO) (100), according to the prior art;

The system includes the SMO (100), a Near Real time RAN Intelligent Controller (Near-RT RIC) (105), a Centralized Unit (CU) (106), a Distributed Unit (DU) (107), an O-Cloud (108), E2 node (109) and O1-O2 interface (110). The SMO (100) includes an AI server (101), a Non-RT Radio Access network (RAN) Intelligent Controller (Non-RT RIC) (102), a Data collector (103) and a Configuration manager (104).

In the SMO (100), the ML model is deployed on the AI server (101) due to large computational requirement for ML models. The AI server (101) can be the CPU, the RAM, storage, a Network Interface Card (NIC) and a power supply unit. The Non-RT RIC (102) is defined as part of the SMO (100), centrally deployed in a service provider network that enables non-real-time (>1 second) control of RAN elements and their resources. The Non-RT RIC sends data to the data collector (103) and the configuration manager (104). The configuration manager (104) helps to deliver the data by enabling secure and scalable deployment of applications, and operating systems. In that, cloud-powered analytics and management for on-premises and internet-based devices is performed. The configuration manager (104) sends the data to the CU (106) and the DU (107) based on the ML model in the AI server (101). The CU (106) in the BS serves as a central point for processing and managing communication signals and data traffic. The DU (107) in the BS serves as a remote radio head that handles a physical layer of wireless communication. The near-RT RIC (105) resides within an edge cloud or a regional cloud and is responsible for intelligent edge control of RAN nodes and resources. The KPI information required by the ML models is sent to the O-Cloud (108) from the data collector (103), the CU (106) and the DU (107). The O-Cloud (108) is a cloud computing platform that is designed to provide scalable, on-demand computing resources to organizations of all sizes. The O1-O2 interface (110) connects the SMO to the RAN managed elements. The management and orchestration functions are received by the managed elements through the O1-O2 interface (110). The SMO in turn receives data from the managed elements via the O1-O2 interface (110) for AI model training. Network operators are connected to the O-Cloud (108) can then operate and maintain the network with the O1-O2 interface (110) by reconfiguring network elements, updating the system, or upgrading the system. The E2 node (109) is designed to be highly available and resilient, to automatically adjust performance based on requirements of workload and distribute traffic across multiple instances.

Figure 2:
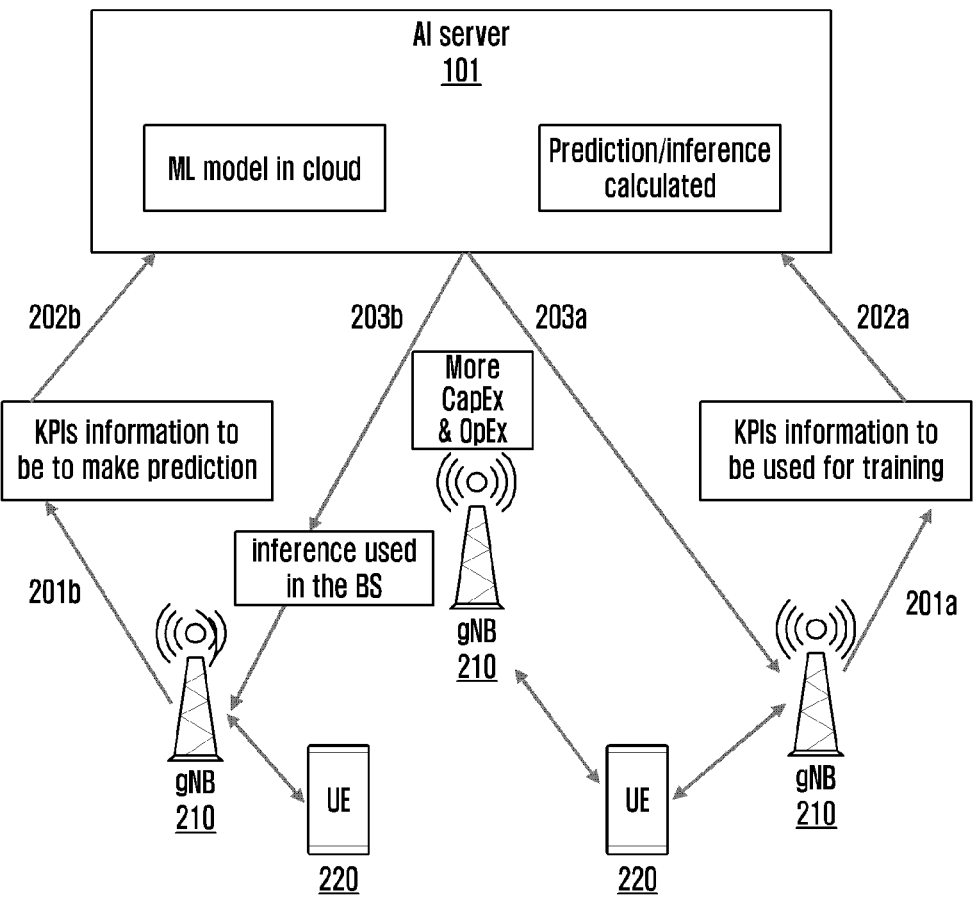
FIG. 2 is a diagram illustrating a high level overview of a system including a ML model in an AI server to predict KPI for both training and inference, according to the prior art.

FIG. 2 is a diagram illustrating a high level overview of a system illustrating ML model in the AI server to predict KPI for both training and inference, according to the prior art. The AI server (101) includes the ML model in the cloud and performs prediction/inference calculation.

In an embodiment, a User Equipment (UE) (220) transmits the KPI information to multiple gNBs (210).

At step 201a, the gNBs (210) receives the transmitted KPI information from the UE and the received KPI information is used for training the NN model.

At step 202a, the gNBs (210) transmits the received KPI information to the AI server (101). In the AI server (101), the ML model in the cloud stores the received KPI information. The ML model in the AI server (101) performs prediction and inference calculation using the stored KPI information.

At step 203a, the BS receives the stored KPI information after completing the prediction and inference calculation of the KPI. In the prediction and inference calculation of the KPI consuming high prediction time, high memory and computational complexity.

At step 201b, the UE (220) transmits the KPI information to the gNB (210). The gNB (210) receives the transmitted KPI information to perform prediction of the target KPI.

At step 202b, the gNB (210) transmits the received KPI information to make prediction. The predicted KPI is stored in the ML model in the cloud. The prediction and inference is calculated based on the stored KPI information in the AI server (101).

At step 203b, the BS receives the calculated prediction KPI and inference with more capital expenditure (CapEx) and Operation Expenses (OpEx). The inference cannot be used in the BS directly.

Referring now to the drawings and more particularly to FIGS. 3 through 17, where similar reference characters denote corresponding features consistently throughout the figures, these are shown various example embodiments.

Figure 3A:
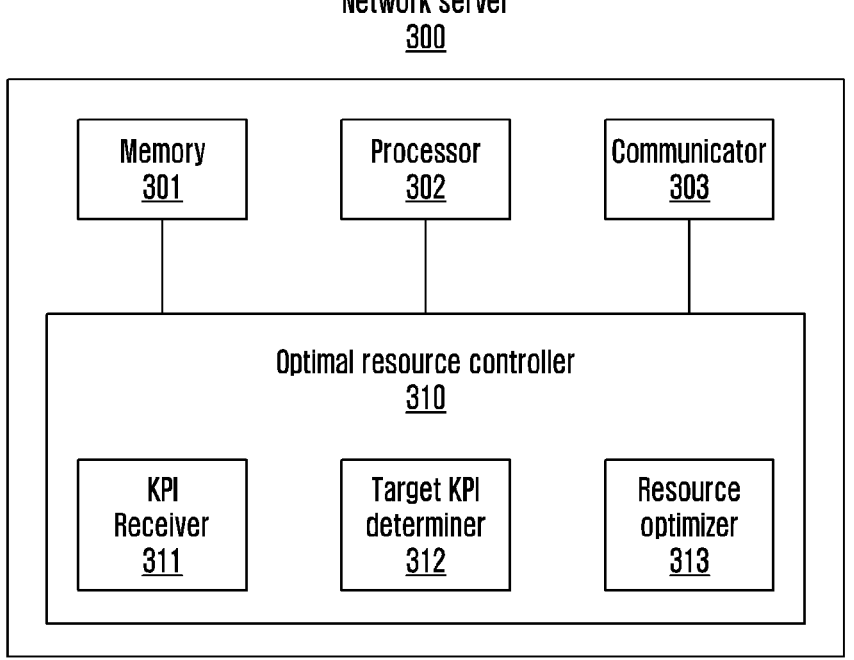
FIG. 3A is a block diagram illustrating an example configuration of a network server for embedding neural networks as a matrix in a wireless network, according to various embodiments.

FIG. 3A is a block diagram illustrating an example configuration of a network server (300) for embedding neural networks as a matrix in a wireless network, according to various embodiments. The network server (300) includes a memory (301), a processor (e.g., including processing circuitry) (302), a communicator (e.g., including communication circuitry) (303) and an optimal resource controller (e.g., including various circuitry) (310).

The memory (301) is configured to store instructions to be executed by the processor (302). The memory (301) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (301) can be for example a non-transitory storage medium. The term "non-transitory" may indicate that the storage medium is not embodied in a carrier wave or a propagated signal. The term "non-transitory" should not be interpreted that the memory (301) is non-movable. In some examples, the memory (301) is configured to store larger amounts of information. In the examples, a non-transitory storage medium may store data that can, over time, change (e.g., in Random Access Memory (RAM) or cache).

The processor (302) may include one or a plurality of processors. The one or the plurality of processors may be a general-purpose processor, such as a Central Processing Unit (CPU), an Application Processor (AP), or the like, a Graphics Processing Unit such as a Visual Processing Unit (VPU), and/or an AI-dedicated processor such as a Neural Processing Unit (NPU). The processor (302) may include multiple cores and is configured to execute the instructions stored in the memory (301).

The communicator (303) includes an electronic circuit specific to a standard that enables wired or wireless communication. The communicator (303) is configured to communicate internally between internal hardware components of the network server (300) and with external device via one or more networks.

In an embodiment, the optimal resource controller (310) may include various control/processing circuitry and is coupled to the memory (301) and the processor (302), and configured to receive the plurality of KPIs from a network device (350). Examples of the network device (350) includes but not limited to the base station (for examples, eNB and gNB), the IOT devices and the like. Further, the optimal resource controller (310) is configured to determine the KPI among the plurality of KPIs as target KPIs that related to a network anomaly using a ML model. Further, the optimal resource controller (310) is configured to determine a correlation of the target KPI with the plurality of KPIs for the network anomaly using the ML model. Further, the optimal resource controller (310) is configured to determine a matrix indicating a relation of the target KPI with the plurality of KPI. Further, the optimal resource controller (310) is configured to optimize a resource of the network device (350) by embedding the matrix in the network device (350).

In an embodiment, a KPI receiver (311) receives a dataset comprises the plurality of KPI from the network device, where the plurality of KPI are related to time-series data of the network device. The plurality of KPIs is received from the network device (350) by the network server (300).

In an embodiment, a target KPI determiner (312) determines the KPI among the plurality of KPIs as the target KPIs that related to the network anomaly using the ML model.

In an embodiment, the target KPI determiner (312) determines the correlation of the target KPI with the plurality of KPIs for the network anomaly using the ML model. The plurality of KPIs with the target KPI are correlated by the network server (300) based on the network anomaly.

In an embodiment, the target KPI determiner (312) determines the matrix indicating the relation of the target KPI with the plurality of KPI. The plurality of KPIs are transmitted to the AI server for training by the network device (350). The plurality of KPIs trained from the AI server is received by the network device (350).

In an embodiment, a resource optimizer (313) optimizes the resource of the network device (350) by embedding the matrix in the network device (350). The resource comprises memory requirements of the network device, computation requirements of the network device, flops of the network device, RAM requirements, GPU requirements, CPU cycles, prediction time of the ML model of the network device. The network device (350) receives the coefficient matrix by the network server (300). The network device (350) embeds the coefficient matrix to optimize the resource of the network device (350). The network device (350) predicts a future network anomaly based on the embedded matrix.

The optimal resource controller (310) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

At least one of the plurality of modules/components of the optimal resource controller (310) may be implemented through an AI model. A function associated with the AI model may be performed through the memory (301) and the processor (302). The one or a plurality of processors controls the processing of the input data in accordance with a predefined operating rule or the AI model stored in a non-volatile memory and a volatile memory. A predefined operating rule or the AI model is provided through training or learning.

Being provided through learning may refer, for example, to, by applying a learning process to a plurality of learning data, a predefined operating rule or the AI model of a desired characteristic being made. The learning may be performed in a network device itself in which the AI according to an embodiment is performed, and/or may be implemented through a separate server/system.

The AI model includes of a plurality of neural network layers. The neural network layer has a plurality of weight values and performs a layer operation through calculation of a previous layer and an operation of a plurality of weights. Examples of neural networks include, but are not limited to, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Generative Adversarial Network (GAN), and a Deep Q-Network.

The learning process may include a method for training a predetermined target network device (for example, a robot) using a plurality of learning data to cause, allow, or control the target network device to make a determination or prediction. Examples of learning processes include, but are not limited to, supervised learning, unsupervised learning, semi-supervised learning, or reinforcement learning.

Although FIG. 3A shows the hardware elements of the network server (300) but it is to be understood that other embodiments are not limited thereon. In other embodiments, the network server (300) may include less or more number of elements. Further, the labels or names of the elements are used for illustrative purpose and does not limit the scope of the disclosure. One or more components can be combined together to perform same or substantially similar function.

Figure 3B:
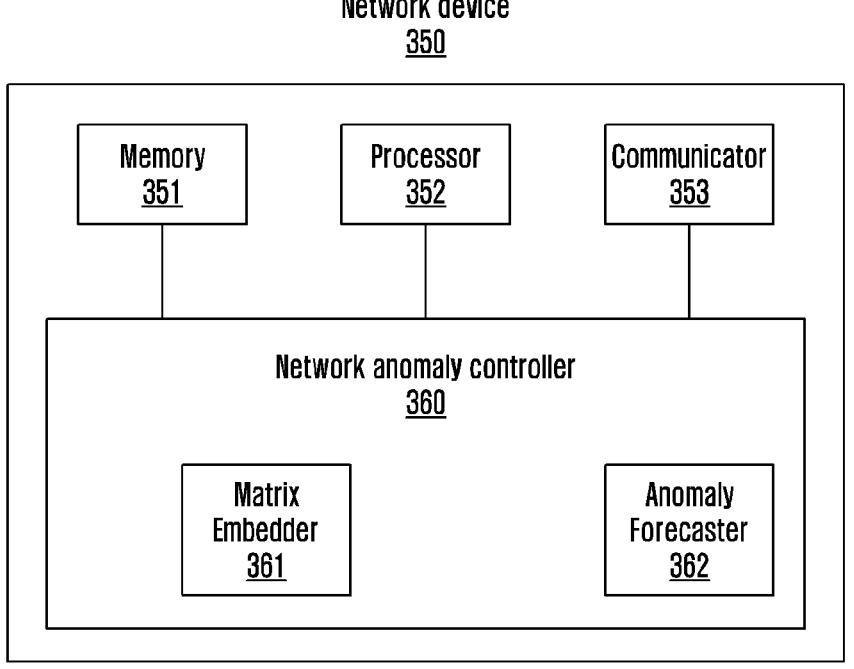
FIG. 3B is a block diagram illustrating an example configuration of a network device for embedding the neural networks as the matrix in the wireless network, according to various embodiments.

FIG. 3B is a block diagram illustrating an example configuration of the network device (350) for embedding neural networks as the matrix in the wireless network, according to various embodiments.

The network device (350) includes a memory (351), a processor (e.g., including processing circuitry) (352), a communicator (e.g., including communication circuitry) (353), a network anomaly controller (e.g., including various control/processing circuitry) (360), a matrix embedder (e.g., including various control/processing circuitry and/or executable program instructions) (361) and an anomaly forecaster (e.g., including various control/processing circuitry and/or executable program instructions) (362).

The memory (351) is configured to store instructions to be executed by the processor (352). The memory (351) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (351) can be for example a non-transitory storage medium. The term "non-transitory" may indicate that the storage medium is not embodied in a carrier wave or a propagated signal. The term "non-transitory" should not be interpreted that the memory (351) is non-movable. In some examples, the memory (351) is configured to store larger amounts of information. In the examples, a non-transitory storage medium may store data that can, over time, change (e.g., in Random Access Memory (RAM) or cache).

The processor (352) may include one or a plurality of processors. The one or the plurality of processors may be a general-purpose processor, such as a Central Processing Unit (CPU), an Application Processor (AP), or the like, a Graphics Processing Unit such as a Visual Processing Unit (VPU), and/or an AI-dedicated processor such as a Neural Processing Unit (NPU). The processor (352) may include multiple cores and is configured to execute the instructions stored in the memory (351).

The communicator (353) includes an electronic circuit specific to a standard that enables wired or wireless communication. The communicator (353) is configured to communicate internally between internal hardware components of the network device (350) and with external network devices via one or more networks.

In an embodiment, the network anomaly controller (360) is coupled to the memory (351) and the processor (352), and configured to embed the matrix as a representation of the neural network to optimize the resource of the network device (350). The matrix indicates a relationship between the target KPI with the plurality of KPIs of the network device (350).

In an embodiment, the network anomaly controller (360) is configured to predict the future network anomaly based on the embedded of the matrix.

In an embodiment, the matrix embedder (361) embed the matrix as the representation of the neural network to optimize the resource of the network device (350). The matrix indicates a relationship between the target KPI with the plurality of KPIs of the network device (350).

In an embodiment, the anomaly forecaster (362) predicts the future network anomaly based on the embedded of the matrix.

The network anomaly controller (360) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

At least one of the plurality of modules/components of the network anomaly controller (360) may be implemented through an AI model. A function associated with the AI model may be performed through the memory (351) and the processor (352). The one or a plurality of processors controls the processing of the input data in accordance with a predefined operating rule or the AI model stored in a non-volatile memory and a volatile memory. A predefined operating rule or the AI model is provided through training or learning.

Being provided through learning may refer, for example to, by applying a learning process to a plurality of learning data, a predefined operating rule or the AI model of a desired characteristic being made. The learning may be performed in a network device itself in which the AI according to an embodiment is performed, and/or may be implemented through a separate server/system.

The AI model includes of a plurality of neural network layers. The neural network layer has a plurality of weight values and performs a layer operation through calculation of a previous layer and an operation of a plurality of weights.

Examples of neural networks include, but are not limited to, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Generative Adversarial Network (GAN), and a Deep Q-Network.

The learning process may include a method for training a predetermined target network device (for example, a robot) using a plurality of learning data to cause, allow, or control the target network device to make a determination or prediction. Examples of learning processes include, but are not limited to, supervised learning, unsupervised learning, semi-supervised learning, or reinforcement learning.

Although FIG. 3B shows the hardware elements of the network device (350) but it is to be understood that other embodiments are not limited thereon. In other embodiments, the network device (350) may include less or more number of elements. Further, the labels or names of the elements are used for illustrative purpose and does not limit the scope of the disclosure. One or more components can be combined together to perform same or substantially similar function.

FIG. 4 is a flowchart illustrating an example method for embedding neural networks as the matrix for network devices in the wireless network, according to various embodiments.

At S401, the network server (300) receives plurality of KPIs from the network device (350).

At S402, the network server (300) determines the KPI among the plurality of KPIs as the target KPIs that related to the network anomaly using the ML model.

At S403, the network server (300) determines a correlation of the target KPI with the plurality of KPIs for the network anomaly using the ML model.

At S404, the network server (300) determines the matrix indicating a relation of the target KPI with the plurality of KPIs. The matrix includes a KPI matrix and a coefficient matrix. The KPI and coefficient matrices are encoded and sent from a Central Management Entity (CME) (for example, a Network Management Entity, a Multi-access Edge Computing (MEC) etc.) to the network device (350).

At S405, the network server (300) optimizes the resource of the network device (350) by embedding the matrix in the network device (350). The resource includes memory requirements, computation requirements, FLOPS, RAM requirements, GPU requirements, CPU cycles and prediction time of the ML model of the network device (350). The prediction time of the ML model of the network device (350) can be but not limited to congestion prediction, handover prediction, MAC scheduling, call mute reduction and the like.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosure.

Figure 5:
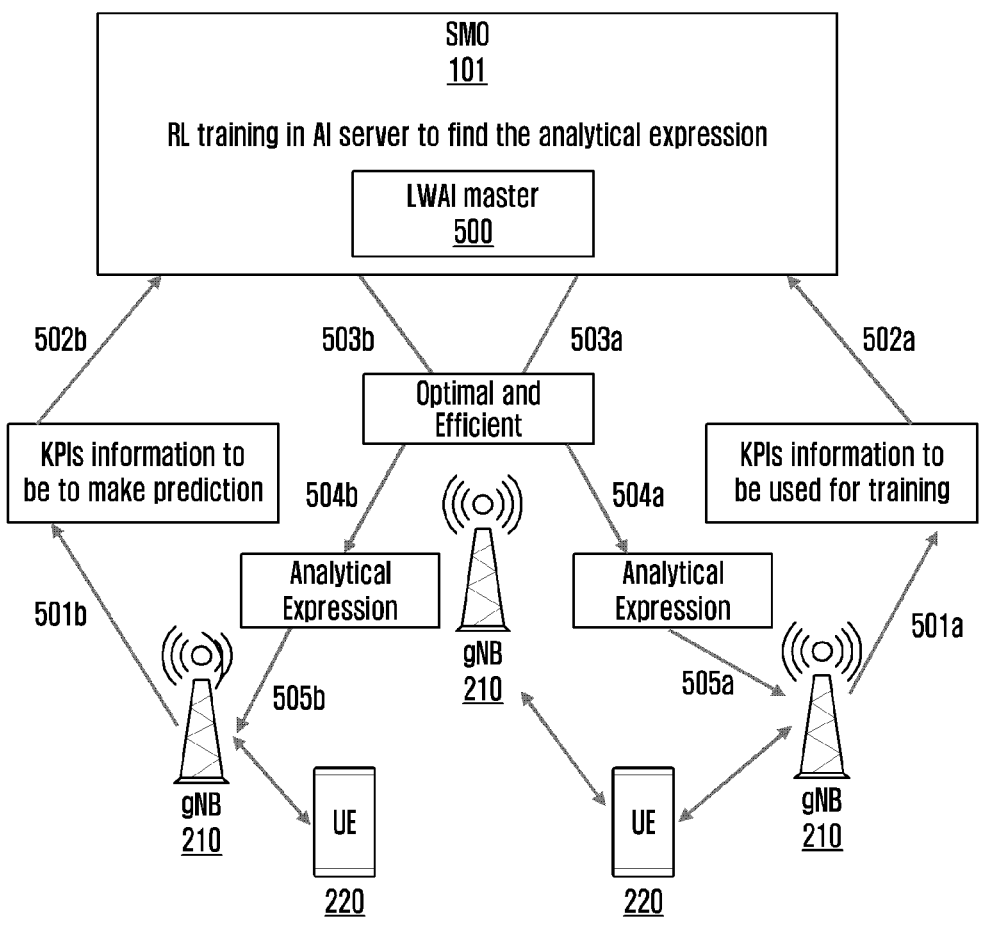
FIG. 5 is a network diagram illustrating the system including the SMO for embedding the neural networks as the matrix for the network device in the wireless network, according to various embodiments.

FIG. 5 is a network diagram illustrating the system including the SMO (100) for embedding neural networks as the matrix for the network device in the wireless network, according to various embodiments.

In an embodiment, the UE (220) transmits the KPI information to the multiple gNBs (210). The gNB (210) receives the transmitted KPI information from the UE.

At step 501*a*, the gNB (210) transmits the received KPI information for training the RL model without using GPU/RAM/Virtual environmental constraints from the network device (350).

At step 502*a*, the SMO (100) determines the KPI among the plurality of KPIs as target KPIs to find an analytical expression using the trained RL model in a LWAI master (500).

At step 503*a*, the LWAI master (500) determines the correlation of the target KPI with the plurality of KPIs for the network anomaly using the trained RL model.

At step 504*a*, the LWAI master (500) determines the matrix indicating a relation of the target KPI with the plurality of KPI. The matrix defines as the analytical expression and a mathematical expression.

At step 505*a*, the LWAI master (500) optimizes the resource of the network device (350) by embedding the matrix in the network device (350) to predict the network anomaly.

At, step 501*b* the gNB (210) receives the KPI from the network device (350) for making prediction without using GPU/RAM/Virtual environmental constraints.

At step 502*b*, the LWAI master (500) receives the KPI information from the gNB (210) for training the RL model and predicting the target KPI.

At step 503*b*, the LWAI master (500) uses the trained RL model to find an optimal and efficient analytical expression. The optimal and efficient analytical expression is determined by running that math function of the NN on an embedded device (804) with less CPU cycles and consuming less memory.

At step 504*b*, the gNB (210) receives the determined analytical expression for optimizing the resource of the network device (350).

At step 505*b*, the UE (220) receives the optimized resource of the network device (350) to embed the matrix in the network device (350).

Figure 6:
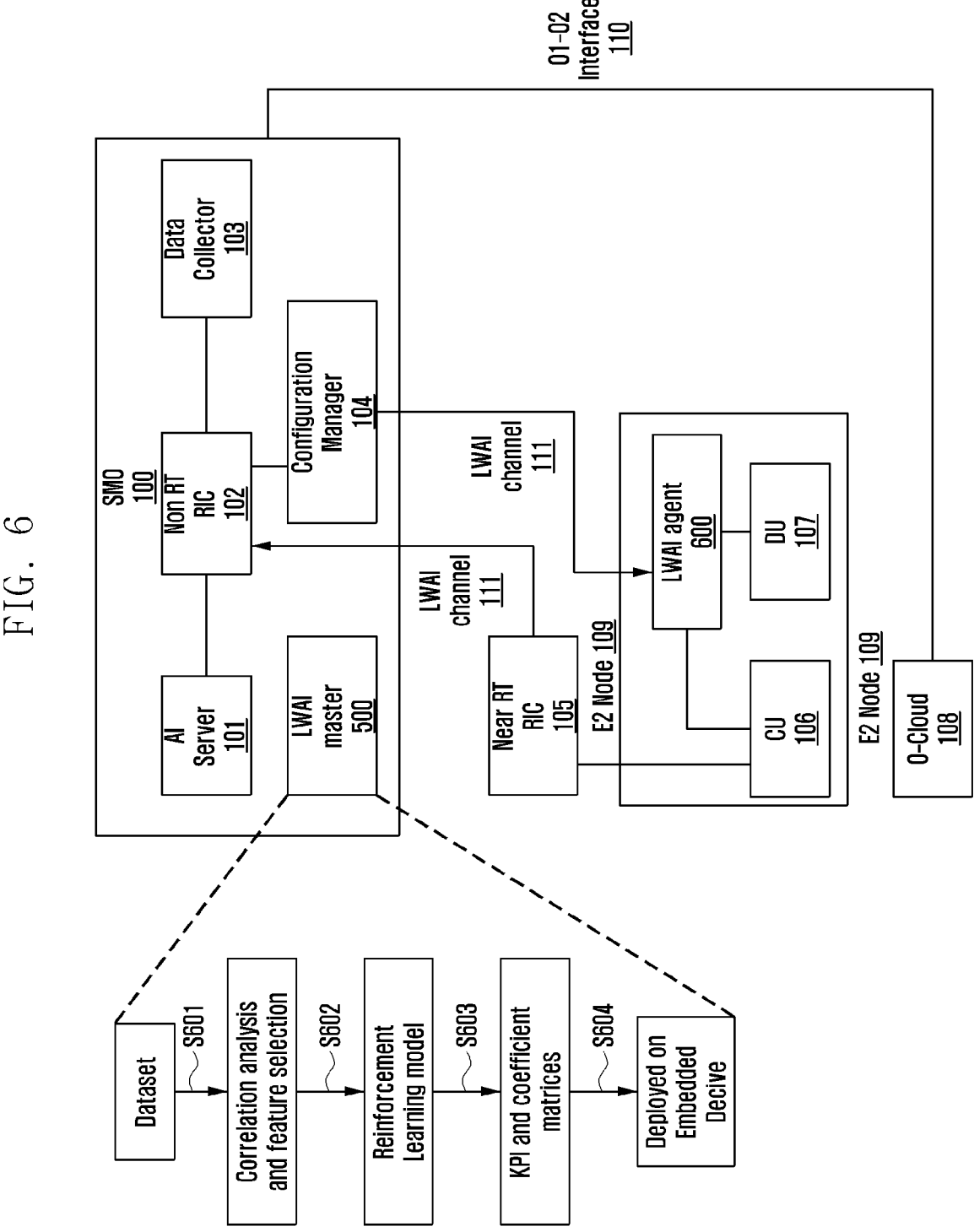
FIG. 6 is a block diagram illustrating a Light Weight Artificial Intelligence (LWAI) master within the system for embedding the neural networks as the matrix for the network device in the wireless network, according to various embodiments.

FIG. 6 is a block diagram illustrating an example configuration of the LWAI master (500) for embedding neural networks as the matrix for the network device in the wireless network, according to various embodiments.

In an embodiment, the system includes the SMO (100), the Near-RT RIC (105), the CU (106), the DU (107), the O-Cloud (108), the E2 node (109) and a LWAI agent (600). The SMO (100) includes the AI server (101), the non-RT RIC (102), the Data collector (103), the configuration manager (104) and the LWAI master (500).

In the SMO (100), the ML model is deployed on the AI server (101) due to large computational requirement for ML models. The AI server (101) can be the CPU, the RAM, storage, a Network Interface Card (NIC) and a power supply unit. The non-RT RIC (102) transmits the KPI information to the data collector (103) and the configuration manager (104). The configuration manager (104) helps to deliver the KPI information by enabling secure and scalable deployment of applications and operating systems. The configuration manager (104) sends the KPI information to the LWAI agent (600) through a LWAI channel (111). The LWAI agent (600) transmits the information to the CU (106) and the DU (107). The CU (106) in the BS serves as a central point for processing and managing the KPI information. The DU (107) in the BS serves as a remote radio head that handles a physical layer of wireless communication. The near-RT RIC (105) resides within the edge cloud or the regional cloud and is responsible for intelligent edge control of RAN nodes and resources. The KPI information required by the ML models is sent to the O-Cloud (108) from the CU (106)

and the DU (107) or IoT devices. The O-Cloud (108) receives the target KPI from the SMO (100). The O1-O2 interface (110) connects the SMO to the RAN managed elements. The management and orchestration functions are received by the managed elements through the O1-O2 interface (110). The SMO in turn receives data from the managed elements via the O1-O2 interface (110) for AI model training. Network operators are connected to the O-Cloud (108) can then operate and maintain the network with the O1-O2 interface (110) by reconfiguring network elements, updating the system, or upgrading the system. The E2 node (109) is designed to be highly available and resilient, to automatically adjust performance based on requirements of workload and distribute traffic across multiple instances.

In an embodiment, the LWAI master (500) performs correlation analysis and feature selection process, RL model training process, matrix determining process and resource deploying process.

At step S601, the LWAI master (500) receives the dataset containing the plurality of KPIs from the network device (350). In multiple KPIs requirement to be pre-processed to identify the target KPIs that is related to the network anomaly. The multiple KPIs are related to time-series data of the network device.

At step S602, the LWAI master (500) performs the correlation analysis and feature selection of the target KPI with the plurality of KPIs for the network anomaly using the RL model.

At step S603, the LWAI master (500) estimates the KPI and coefficient matrices for indicating the relation of the target KPI with the plurality of KPIs to predict the target KPI using the RL model.

At step S604, the LWAI master (500) transmits coefficient matrices to the embedded device (804) for optimizing the resource of the network device by embedding the matrix in the network device (350).

Figure 7:
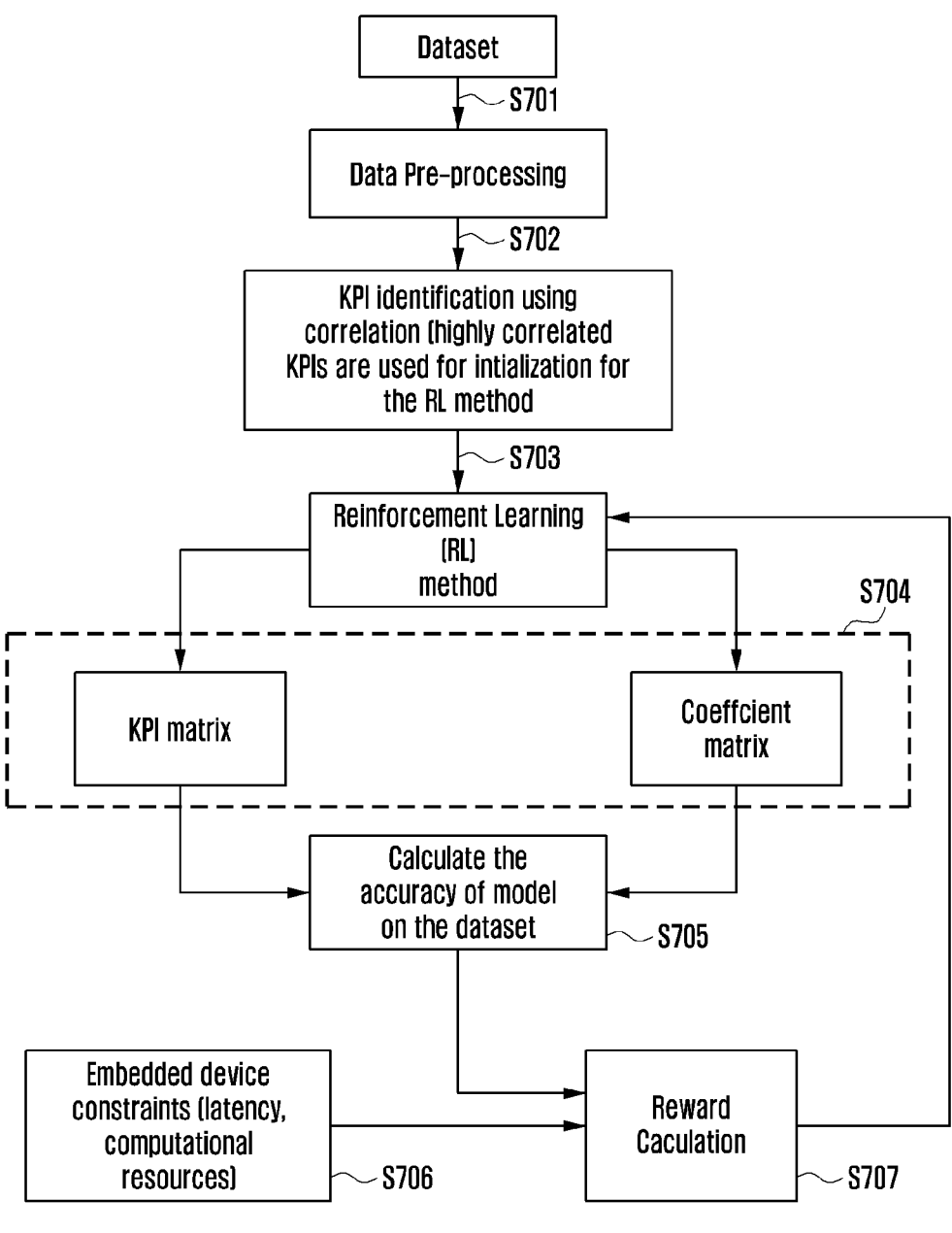
FIG. 7 is a flowchart illustrating an example method for embedding the neural networks as the matrix for the network device in the wireless network, according to various embodiments.

FIG. 7 is a flowchart illustrating an example method for embedding neural networks as the matrix for the network device in the wireless network, according to various embodiments.

At step S701, the LWAI master (500) receives the dataset containing the plurality of KPIs from the network device (350) to generate neural network architecture, the coefficient matrix or any ML formulation using KPIs.

At step S702, the LWAI master (500) performs the data pre-processing step which performs correlation analysis and feature selection of the KPI.

At step S703, the LWAI master (500) determines the highly correlated KPIs for initialization of the RL model. The RL model in the AI server (101) receives the highly correlated KPIs to estimate KPI and coefficient matrices.

At step S704, the LWAI master (500) estimates the KPI and coefficient matrices for indicating the relation of the target KPI with the plurality of KPIs to predict the target KPI.

At step S705, the LWAI master (500) transmits the KPI and coefficient matrices to the embedded device (804) for optimizing the resource of the network device (350) by embedding the matrix in the network device (350) to calculate accuracy of the RL model on the dataset.

At step S706, the embedded device (804) receives the KPI and coefficient matrices with constraints such as latency, prediction accuracy, computational resources (FLOPS and memory) and update threshold.

At step S707, the embedded device (804) performs reward calculation using the constraints and the prediction accuracy. The reward is sent to the RL model to update the prediction of the target KPI.

$$\text{Target } KPI_1 = a_1 \cdot f(KPI_1) + \beta_1 \cdot h(KPI_2) \cdot g(KPI_2) \cdot g(KPI_3) + \gamma_1 \quad (1)$$

$$k(KPI_4) + \delta_1 \cdot KPI_5$$

$$\text{Target } KPI_2 = a_2 \cdot f(KPI_1) + \beta_2 \cdot h(KPI_2) \cdot g(KPI_3) + \gamma_2 \cdot k(KPI_4)$$

$$\text{Target } KPI_3 = a_3 \cdot f(KPI_1) + \beta_3 \cdot h(KPI_3) + \gamma_3 \cdot k(KPI_4)$$

$$KPI = \begin{pmatrix} f(KPI_1) & g(KPI_1) & h(KPI_1) & \cdots \\ f(KPI_2) & g(KPI_2) & h(KPI_2) & \cdots \\ f(KPI_3) & g(KPI_3) & h(KPI_3) & \cdots \\ \vdots & \vdots & \ddots & \vdots \\ f(KPI_i) & g(KPI_i) & h(KPI_i) & \cdots \end{pmatrix}$$

$$C = \begin{pmatrix} \alpha_1 & \beta_1 & \gamma_1 & \cdots \\ \alpha_2 & \beta_2 & \gamma_2 & \cdots \\ \alpha_3 & \beta_3 & \gamma_3 & \cdots \\ \vdots & \vdots & \ddots & \vdots \\ \alpha_4 & \beta_4 & \gamma_4 & \cdots \end{pmatrix}$$

$$E = \sum_{\gamma=1}^{R} kpi^r \otimes c^r \quad (2)$$

where $\otimes$ denotes the outer(tensor) product and $kpi^r$ and $c^r$ are all vectors.

KPI and coefficient matrices includes of:

The target KPI is defined on the LHS (expected output). The LHS includes of combination on sub functions of different KPI that are combined with different mathematical operations (multiplication, addition, exponents). The sub functions makes the KPI and coefficient matrices on the RHS and mathematical operations like logarithmic expression, double exponents and the like, where $\alpha$, $\beta$ and $\gamma$ are coefficients for different KPIs.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosure.

Figure 8:
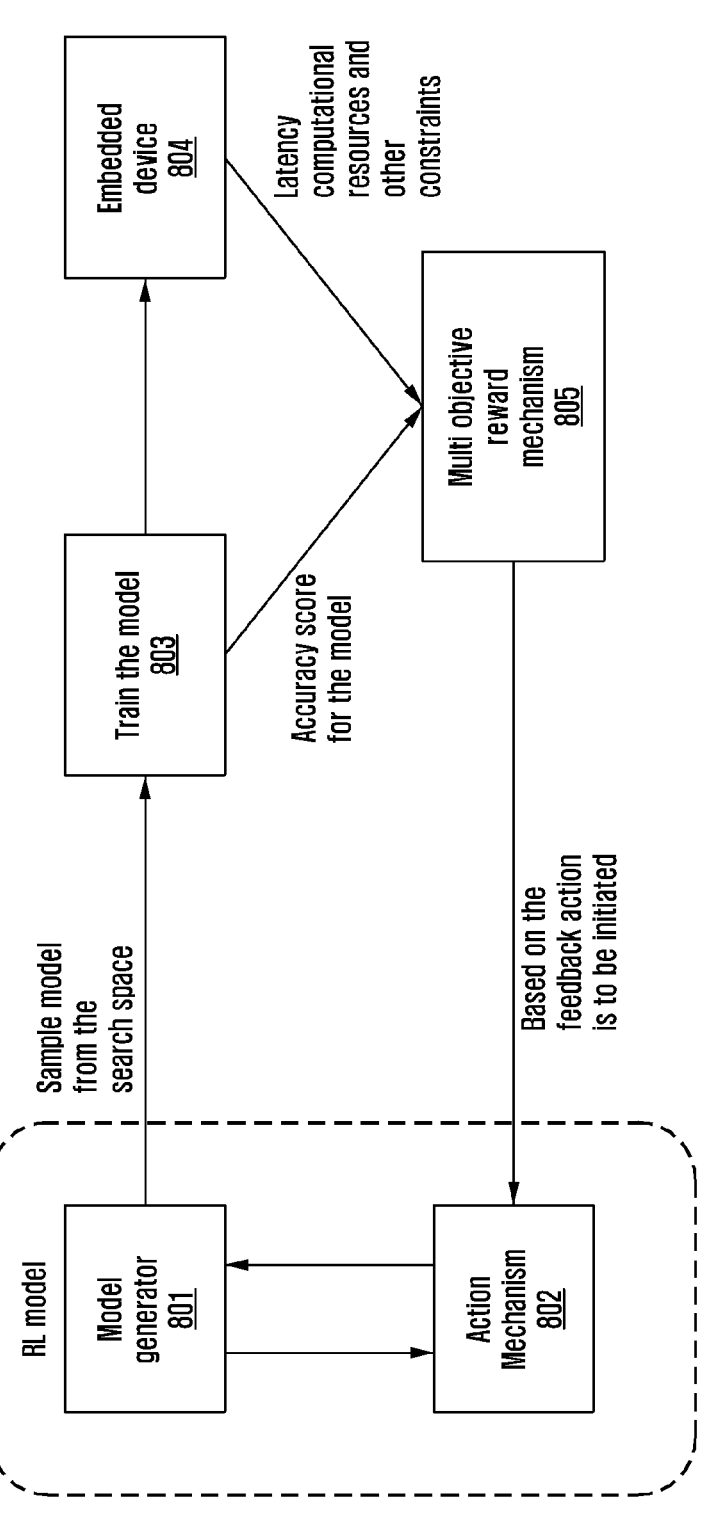
FIG. 8 is a block diagram illustrating an example configuration of a Reinforcement Learning (RL) model for embedding the neural networks as the matrix for the network device in the wireless network, according to various embodiments.

FIG. 8 is a block diagram illustrating an example of the RL model for embedding neural networks as the matrix for the network device in the wireless network, according to various embodiments.

In an embodiment, the RL model of the neural network includes a model generator (801), an action mechanism (802), a RL model (803), the embedded device (804) and a multi objective reward mechanism (805).

The model generator (801) generates a sample RL model from a search space.

The sample RL model (803) is sent to the action mechanism (802) to deduce a given NN representing by the dataset into the analytic expression for highly optimized inference time at the CPU/memory constraint BS.

The RL model (803) from the search space is trained for predicting the target KPI. The predicted target KPI determines the KPI and coefficient matrices. The KPI and coefficient matrices are sent to the embedded device (804).

The embedded device (804) is connected with the multi objective reward mechanism (805) for reducing FLOPS and latency.

The multi objective reward mechanism (805) sends feedback action to be initiated to the action mechanism (802). The output of the action mechanism (802) is sent to the model generator (801).

The model generator (801) repeats the function for predicting the network anomaly with less latency.

Figure 9:
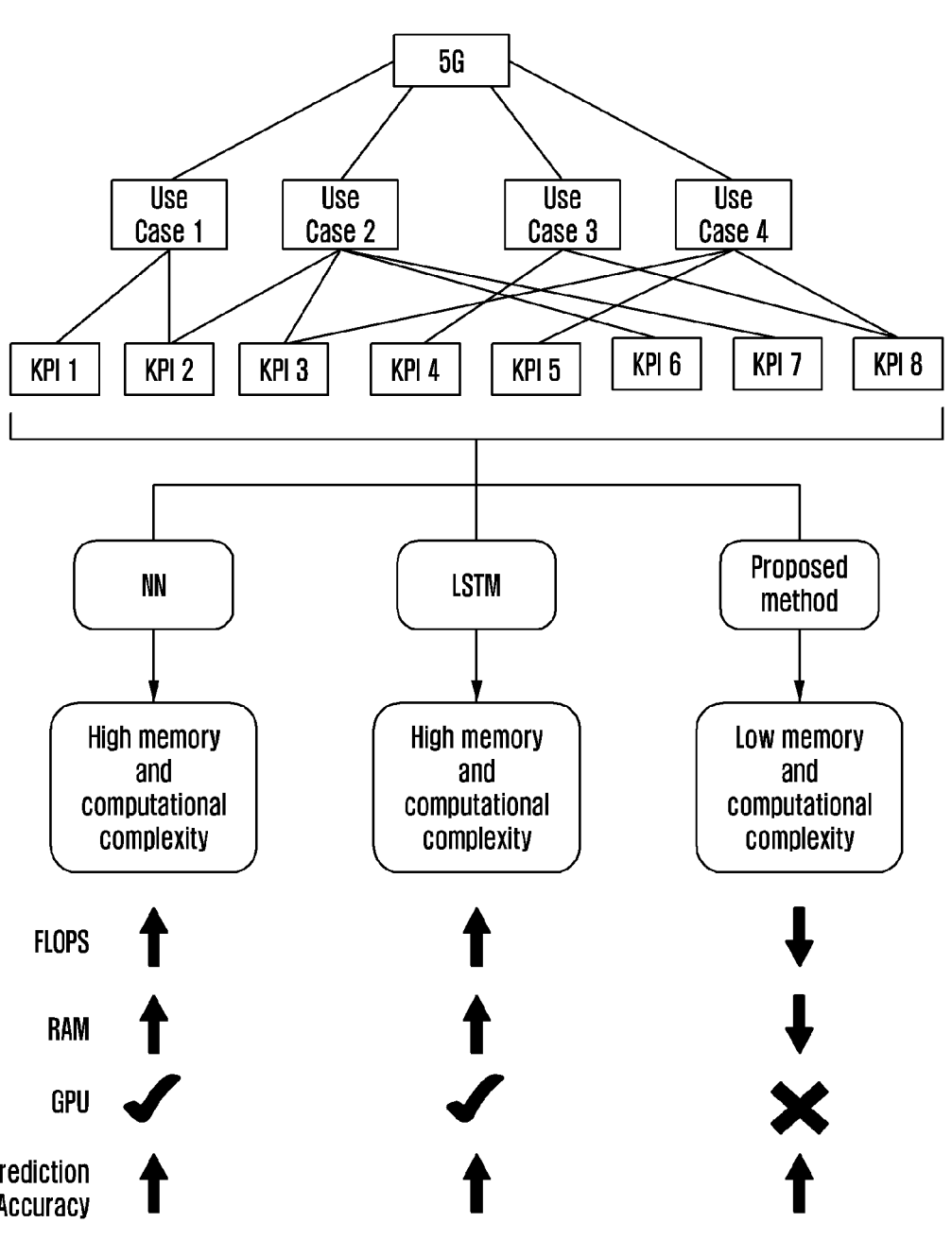
FIG. 9 is a flow diagram illustrating an example of a 5G network including with plurality of KPIs for embedding neural networks as the matrix for the network device in the wireless network, according to various embodiments.

FIG. 9 is a flow diagram illustrating an example of a 5G network including with plurality of KPIs for embedding neural networks as the matrix for the network device in the wireless network, according to various embodiments.

In an embodiment, the disclosed method is used for predicting the target KPI in the plurality of the KPIs that promises lower latency and improves performance.

The plurality of the KPIs are performed by the NN model, Long Short-Term Memory (LSTM) and the RL model with KPI and coefficient matrices. In the NN and the LSTM model, constraints of the embedded device (804) are used for predicting the network anomaly consuming high memory, more FLOPs and computational complexity.

In the disclosed method, the RL model is used to estimate the KPI and coefficient matrices for predicting the network anomaly consuming low memory and computational complexity and reduces FLOPs.

$$DL\ FULL\_PRBUtilization_{i+1}^{BS1} = \quad (3)$$

$$C_{1,1} \cdot DATATTI\_DL\_DOM_i + C_{1,2} \cdot DATATTI\_DL\_NOM_i +$$

$$C_{1,3} \cdot QCI2DLTraffic\_VideoCall\_MB_i \cdot DL\ FULL\_PRBUtilization_i^2 + C_{1,4}$$

$$DL\ FULL\_PRBUtilization_{i+1}^{BS2} = C_{2,1} \cdot DATATTI\_DL\_DOM_i + C_{2,2} \cdot DATATTI\_DL\_NOM_i +$$

$$C_{2,3} \cdot QCI2DLTraffic\_VideoCall\_MB_i \cdot DL\ FULL\_PRBUtilization_i^2 + C_{2,4}$$

$$DL\ FULL\_PRBUtilzation_{i+1}^{BS3} = C_{3,1} \cdot DATATTI\_DL\_DOM_i + C_{3,2} \cdot DATATTI\_DL\_NOM_i +$$

$$C_{3,3} \cdot QCI2DLTraffic\_VideoCall\_MB_i \cdot DL\ FULL\_PRBUtilization_i^2 + C_{3,4}$$

$$DL\ FULL\_PRBUtilization_{i+1}^{BSN} =$$

$$C_{N,1} \cdot DATATTI\_DL\_DOM_i + C_{N,2} \cdot DATATTI\_DL\_NOM_i +$$

$$C_{N,3} \cdot QCI2DLTraffic\_VideoCall\_MB_i \cdot DL\ FULL\_PRBUtilization_i^2 + C$$

-continued (4)

$$C_{m,n} = \begin{pmatrix} -1.87479097e-03 & -1.91358485e-03 & -2.28988789e-03 & 5.60259495e+03 \\ -1.4767903e-03 & -2.1356390e-03 & -2.189344481e-03 & 6.12279499e+03 \\ -1.37479956e-03 & -1.01368220e-02 & -18658818e-03 & 5.0259495e+03 \\ \vdots & \vdots & \vdots & \vdots \\ C_{N,1} & C_{N,2} & C_{N,3} & C_{N,4} \end{pmatrix}$$

Target $KPI_1 = a.f(KPI_1) + \beta.h(KPI_2) \cdot g(KPI_3) + \gamma \cdot k(KPI_4)$ $f(FPI_1) = a.KPI_1^n + b.KPI_1^m + c$                                    (5)

$h(KPI_2) = d.KPI_2^e + i$ $g(KPI_3) = j.KPI_3^t + r.KPI_3^s$ $k(KPI_4) = p.KPI_4^q + r.KPI_4^s + x.KPI_4$ $DL\ FULL\_PRBUtilization_{i+1} = a.DATATTI\_DL\_DOM_i + b.DATATTI\_DL\_NOM_i +$     (6)

$c.QCI2DLTraffic\_VideoCall\_MB_i \cdot DL\ FULL\_PRBUtilization_i^2 + d$

TABLE 1

| KPI | Description |
|-----|-------------|
| DL FULL_PRBUtilisation$_{i+1}$ | DL Full PRB utilisation at time i+1 |
| DATATTI_DL_NOMi | Data TTI DL NOM at time i |
| DATATTI_DL_DOMi | Data TTI DL DOM at time i |
| QCI 2 ULTrafficVideoCall_Mbi | QCI 2 UL traffic video call at time i |
| DL FULL_PRBUtilizationi | DL Full PRB utilisation at time i |

Table 1 describes KPI and Coefficient matrices in detail. Following expression (6) is obtained after running the RL model. In prediction of DL Full PRB utilization, the value of a=−1.87479097e-03, b=−1.91358485e-03, c=−2.28988789e-03 and d=5.60259495e+03.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosure.

Figure 10:
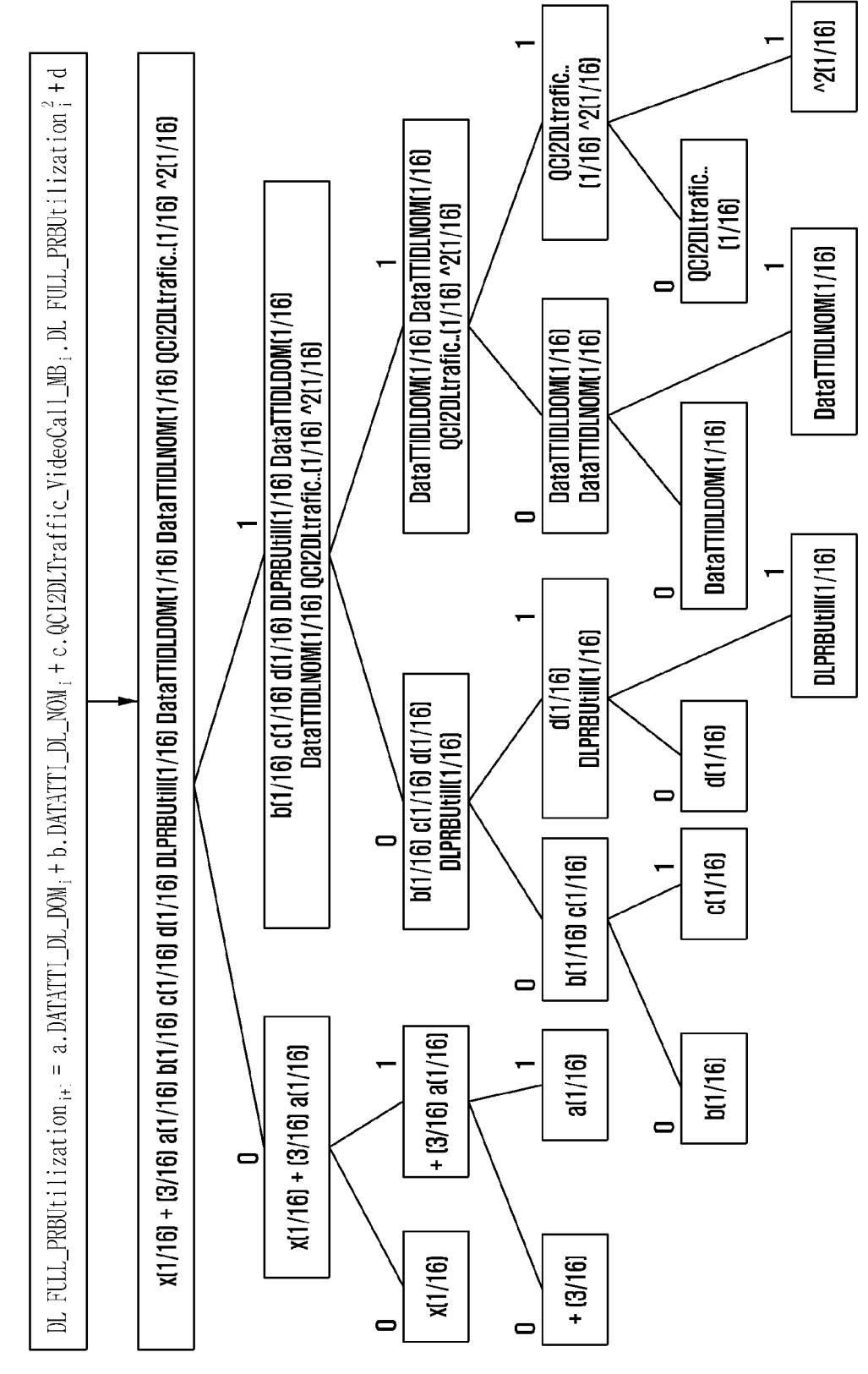
FIG. 10 is a diagram illustrating a Shannon Fano encoded tree structure, according to various embodiments.

FIG. 10 is a diagram illustrating a Shannon-Fano encoded tree structure, according to various embodiments.

In an embodiment, the Shannon-Fano model includes an entropy encoding technique for lossless data compression of multimedia. The Shannon-Fano model is used for encoding the formula. The.

In an embodiment, the Shannon-Fano model is used for encoding the formula:
1. Probability of terms and expression in the formula that is calculated and arranged in a sorted list.
2. The sorted list is split into two equal parts in such a way that the two parts are almost equal probabilities.
3. In equal probabilities, assign 0 to a left part and 1 to a right part.
4. Repeat steps 2 and 3 until entire symbols are split into individual subgroups.

The LWAI master (500) transmits encoded data containing KPI & Coefficient matrix to the LWAI agent (600) to be realized on the DU (107)/the CU (106).

In an embodiment, the LWAI master (500) transmits a message structure to the LWAI agent (600).

The LWAI master (500) generates the KPI and coefficient matrix for prediction (for example, DL PRB Utilization, congestion prediction, load prediction etc.) A total number of KPIs in matrix:

1. DATATTI_DL_NOM$_i$
2. DATATTI_DL_DOM$_i$
3. FULL_PRBUtilization$_i$
4. QCI2ULTraffic VideoCall Mb$_i$
5. DL FULL_PRBUtilization$_i$ Length of encoded sequence (32 bits): The matrix is represented as a series of 0s to 1s using the Shannon Fano model after compression.

TABLE 2

| 16 bits | 16 bits |
|---------|---------|
| Target KPI value<br>0x00:DL Full PRB Util<br>0x01:Congestion_Pred,<br>0x02:XYZ<br>...<br>0xFF: ABC | Total number of KPIs in matrix |
| Encoding Sequence Length<br>(Length of encoding sequence representing Matrix in Bytes) | — |
| Encoded sequence 001010011.... | — |

Table 2 defines a suggested message exchange protocol of the LWAI channel (111).

Figure 11A:
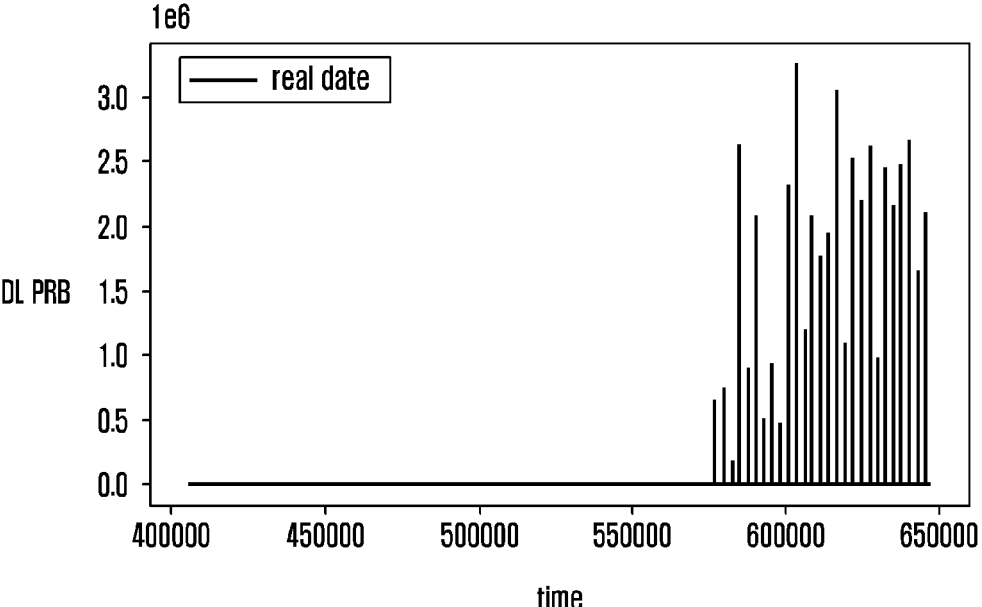
FIG. 11A is a graph illustrating real data at initial RL training process, according to various embodiments.

FIG. 11A is a graph illustrating real data at initial RL training process, according to various embodiments. The real data is used for predicted. The RL model starts from without KPI and coefficient matrices.

Figure 11B:
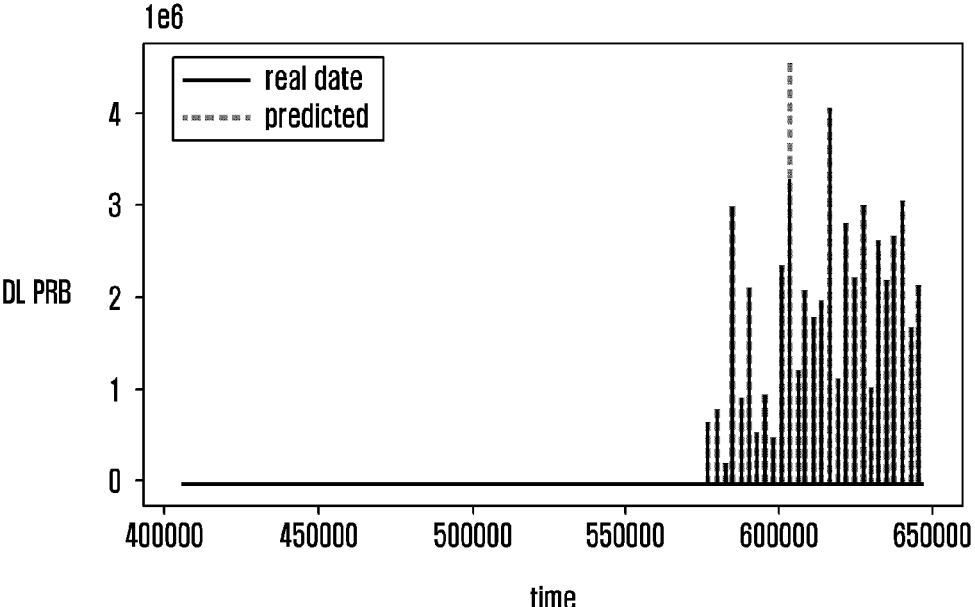
FIG. 11B is a graph illustrating real data and predicted data at middle RL training process, according to various embodiments.

FIG. 11B is a graph illustrating real data and predicted at middle of RL training process according to various embodiments. Using the RL model to predict the data to improve prediction accuracy. The RL model starts to form an approximate KPI and coefficient matrices.

Figure 11C:
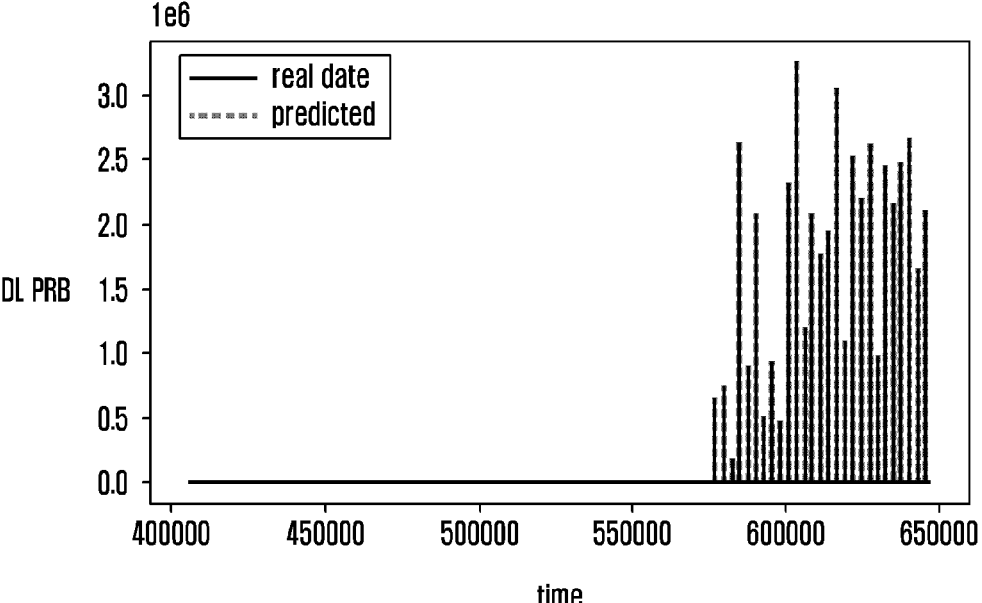
FIG. 11C is a graph illustrating real data and predicted data at end RL training process, according to various embodiments.

FIG. 11C is a graph illustrating real data and predicted data after the RL training process according to various embodiments. Using the RL model to predict the data with high prediction accuracy. The RL outputs final KPI and coefficient matrices.

TABLE 3

| No. of variables | No. of Operations | Memory | Accuracy (in %) |
|------------------|-------------------|--------|------------------|
| 4 | 8 | 20 bytes | 92.34% |

In Table 3, the disclosed method of KPI and coefficient matrices to compare prediction accuracy vs FLOPS vs Memory. In the disclosed method, number of operations are 600 times less CPU cycles and the prediction accuracy is 350 times less RAM compared to the conventional methods.

Figure 12A:
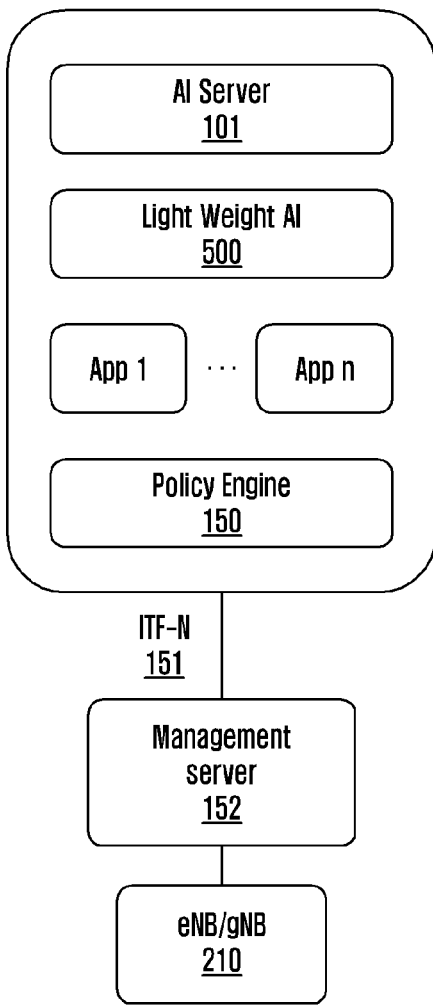
FIG. 12A is a block diagram illustrating an example of a first scenario of a different network architecture for embedding neural networks as the matrix for the network device in the wireless network, according to various embodiments.

FIG. 12A is a block diagram illustrating a first scenario of a different network architecture for embedding neural networks as the matrix for the network device in the wireless network, according to various embodiments.

In an embodiment, the LWAI master (500) can be a part of the independent server in which provides the AI as a service and further optimizes and automates the AI service with more applications using a policy engine (150). An ITF-N (151) connects a Network Management System (NMS) either to Element Mangers (EMs) or directly to the Network Elements (NEs). In the following, subordinate entities defines either EMs or NEs, which are in charge of supporting the Itf-N. A management server (152) transmits the AI service to the gNB (210).

Figure 12B:
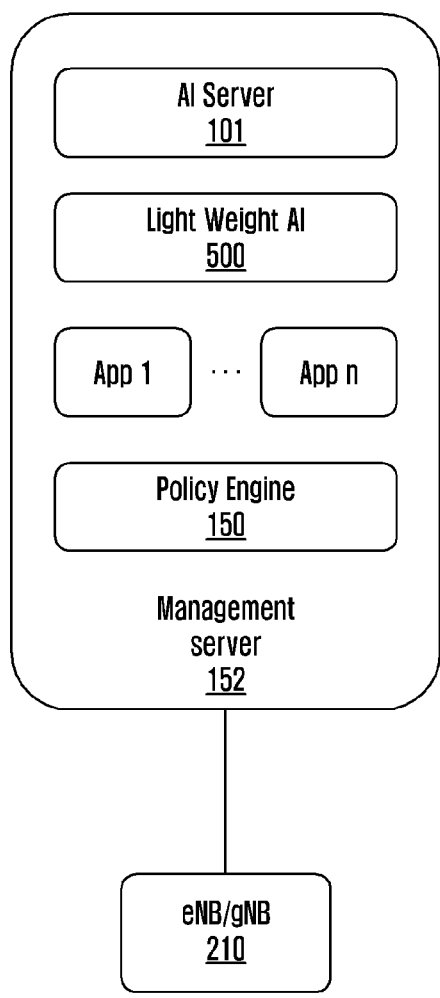
FIG. 12B is a block diagram illustrating an example of a second scenario of the different network architecture for embedding neural networks as the matrix for the network device in the wireless network, according to various embodiments.

FIG. 12B is a block diagram illustrating a second scenario of the different network architecture for embedding neural networks as the matrix for the network device in the wireless network, according to various embodiments.

In an embodiment, the LWAI master (500) can be the part of the management server (152) that is planned to be upgraded with Intelligent AI solutions using the policy engine (150). The upgraded intelligent AI solutions are sent to the gNB (210).

Figure 12C:
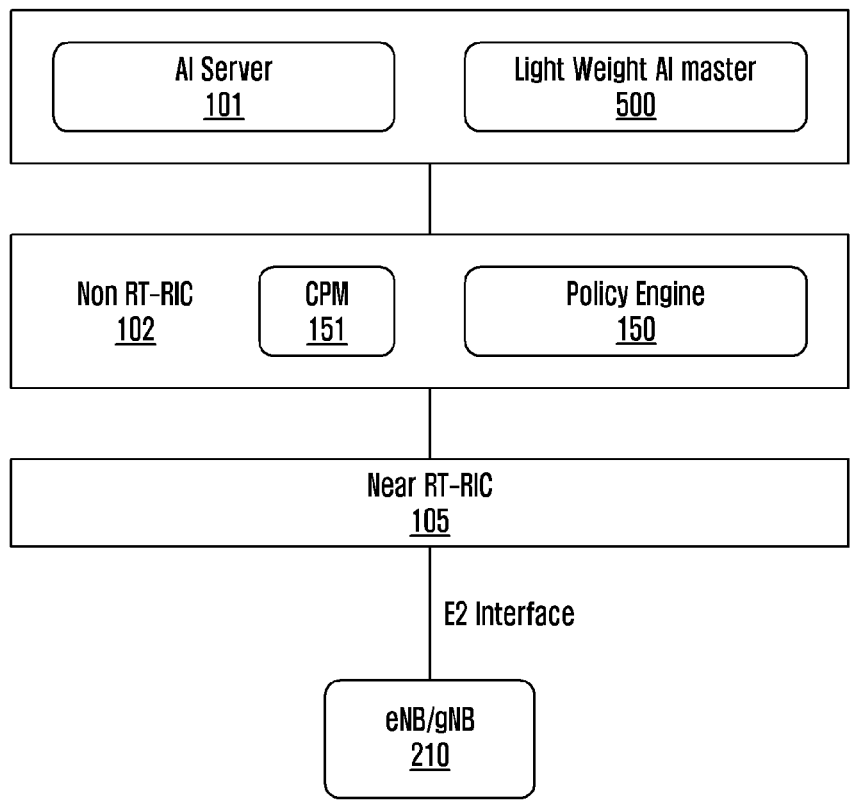
FIG. 12C is a block diagram illustrating an example of a third scenario of the different network architecture for embedding neural networks as the matrix for the network device in the wireless network, according to various embodiments.

FIG. 12C is a block diagram illustrating a third scenario of the different network architecture for embedding neural networks as the matrix for the network device in the wireless network, according to various embodiments.

In an embodiment, the LWAI master (500) can be a part of Open-RAN (O-RAN) solution and co-exist with the AI server (101) like the LWAI master (500) with the independent server and interacts with the non-RT RIC (102) or the near-RT RIC (105) to further optimize the AI solutions using the policy engine (150).

Figure 13:
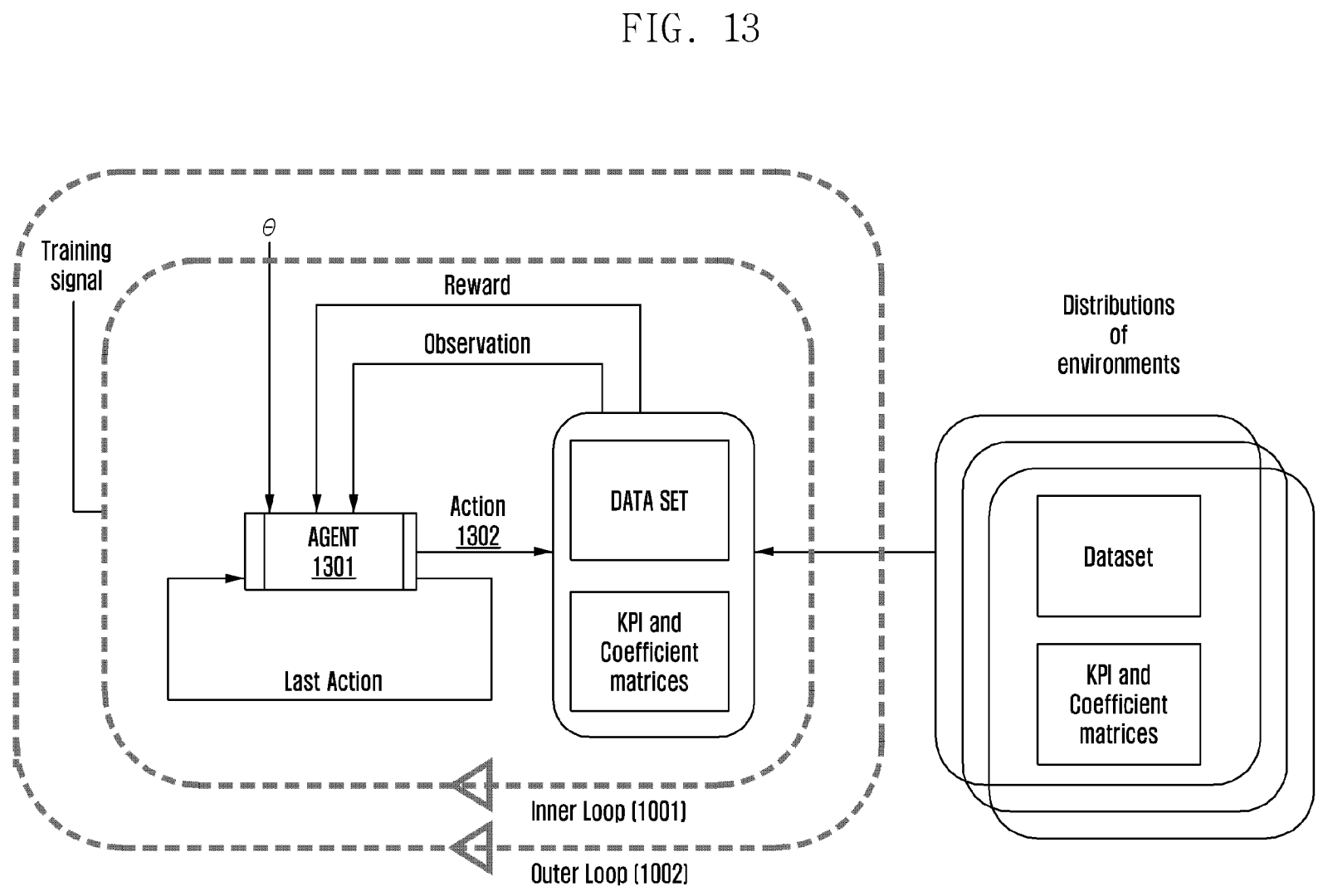

FIG. 13 is a block diagram illustrating an example configuration of a system for fed data to a Meta RL system, according to various embodiments.

The Meta-RL is a type of machine learning technique that involves learning how to learn in the context of the RL. In conventional RL, an agent (1301) interacts with an environment and receives rewards for certain actions it takes. A goal is to learn a policy that maximizes and/or increases the cumulative reward over time.

In the Meta-RL, the agent (1301) learns to learn by adapting the policy based on prior experiences with different tasks. The agent (1301) quickly generalizes to new tasks using its prior knowledge and adapting to the specific requirements of the new task.

In meta-learning process involves learning a set of parameters that can be used to quickly adapt to new tasks. These parameters can be thought of as "meta-policies" that govern how the agent (1301) should adapt its policy for each new task. The meta-policy is learned by training on a set of related tasks and optimizing for fast adaptation.

Once the meta-policy is learned, the agent (1301) can be deployed to new tasks and quickly adapt its policy based on the specific requirements of the task. This allows the agent (1301) to learn much faster than conventional RL methods, which require extensive trial-and-error learning to achieve good performance on new tasks.

The Meta-RL is shown promising results in a variety of applications, including robotics, game playing, and natural language processing.

For finding the KPI and coefficient matrices (1304) for different datasets, the Meta-RL is used. The Meta-RL learns the policy for generating the coefficient and KPI matrix given a new dataset. The dataset varies in terms of number of KPIs, types of KPIs and other parameters.

The Meta RL is able to generalize a task of finding the right KPI and coefficient matrices for any particular dataset. This enables a user to automate the learning process of the general RL for finding efficient matrices that can be used to predict future KPI values.

The Meta RL system receives data from the datasets. An inner loop (1001) loop determines the KPI and coefficient matrices for one particular dataset.

In an embodiment, an outer loop (1002) determines the generalized approach of generating the KPI and coefficient matrices (1304) from any dataset.

The agent (1301) makes the observation from the dataset. The agent (1301) uses the policy at time t to execute an action (1302) (KPI and coefficient matrix values). The agent (1301) updates the policy.

The Meta-RL working process is determined by the following function:

Task Distribution: A first step in the Meta-RL is to define a distribution of related tasks that the agent (1301) will learn from. These tasks can be related in various ways, such as having similar state and action spaces or sharing a common objective.

Training Phase: The agent (1301) is then trained on a set of these related tasks using a meta-learning model. The meta-learning model learns a set of parameters that can be used to quickly adapt to new tasks. These parameters can be thought of as "meta-policies" that govern how the agent should adapt its policy for each new task. The meta-policy is learned by optimizing for fast adaptation to new tasks while also maintaining good performance on the training tasks.

Adaptation Phase: Once the meta-policy is learned, the agent (1301) can be deployed to new tasks and quickly adapt its policy based on the specific requirements of the task. During the adaptation phase, the agent (1301) uses its prior knowledge (e.g., the meta-policy) to quickly learn the optimal policy for the new task. The agent (1301) interacts with the environment and receives feedback in the form of rewards for its actions. The agent (1301) uses this feedback to update its policy until it finds the optimal policy for the task at hand.

Generalization: The meta-policy allows the agent (1301) to generalize to new tasks using its prior knowledge and adapting to the specific requirements of the new task. This allows the agent (1301) to learn much faster than conventional RL models, which require extensive trial-and-error learning to achieve good performance on new tasks.

Pseudo code: initialize meta-policy parameters θ for i in range (num_episodes):

```
sample a set of tasks T
for task in T:
    initialize    policy    parameters    φ    with    θ
for t in range(num_steps):
    observe state s
    select action a using policy π(s; φ)
        receive reward r and next state s'
        update policy parameters φ using RL algorithm with (s, a, r, s')
        update meta-policy parameters θ using meta-learning
algorithm with the updated policy parameters φ
```

In this pseudo code, the meta-policy parameters θ are initialized at the beginning. Then, for each episode, a set of related tasks T are sampled. For each task, the policy parameters φ are initialized with the current value of θ. The agent (1301) interacts with the environment using the policy π(s; φ) to select actions and receives rewards.

The policy parameters φ are updated using the RL model with the observed state, action, reward, and next state. Finally, the meta-policy parameters θ are updated using a meta-learning model with the updated policy parameters φ.

Figure 14:
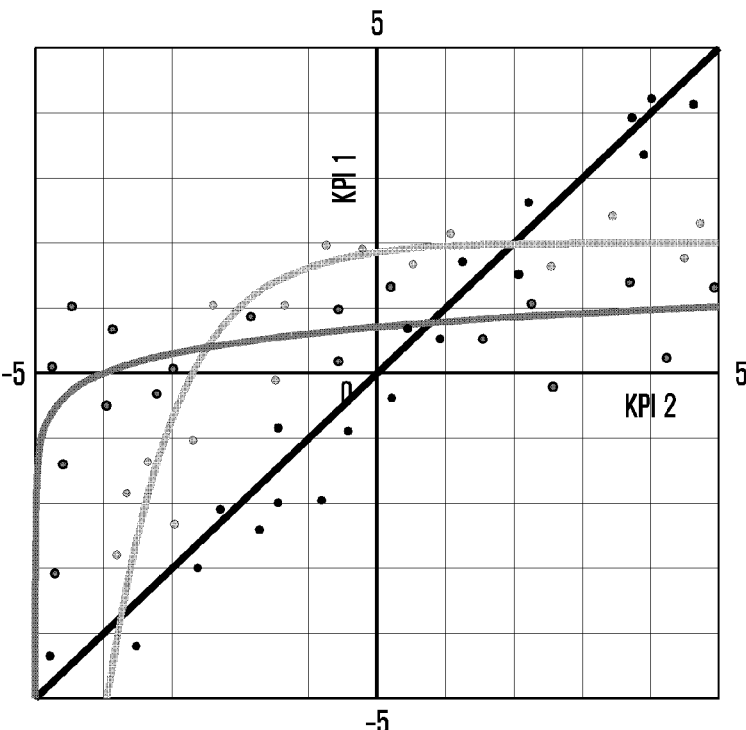
FIG. 14 is a graph illustrating a KPI relationship between two KPIs to use log, exponential, or polynomial based approaches to, according to various embodiments.

FIG. 14 is a graph illustrating a relationship between two KPIs to use log, exponential, or polynomial based approaches, according to various embodiments.

In an embodiment, the model generator (801) is added or removed analytical matrices from the formula to generate a final expression.

Depending on objective or the dataset provided the RL model approximates the analytical matrices that aptly represent the target data.

The reward calculation is performed to give positive or negative reward based on the efficacy of the expression.

The RL model predicts the KPI and coefficient matrices formulation. The KPI and coefficient matrices formula are derived in exponential, logarithmic and polynomial function.

Figure 15:
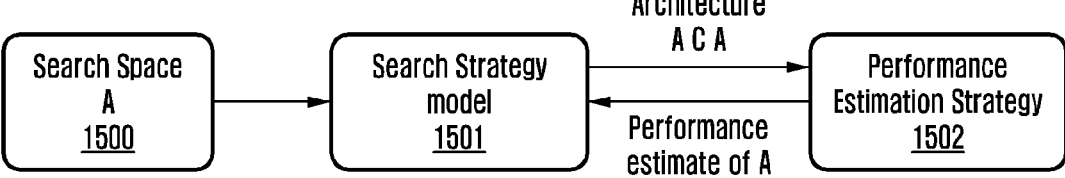
FIG. 15 is a diagram illustrating an example RL agent flow, according to various embodiments.

FIG. 15 is a diagram illustrating example RL agent flow, according to various embodiments;

In an embodiment, a search space (1500) contains a set of possible neural network architectures. The neural networks include with a search strategy model (1501).

An optimization model is used to automatically predict optimal RL model within the search space.

The predicted optimal RL model measures, estimates or predicts the performance of a large number of proposed models in order to obtain feedback for the search model to learn by performance estimation strategy (1502).

Figure 16A:
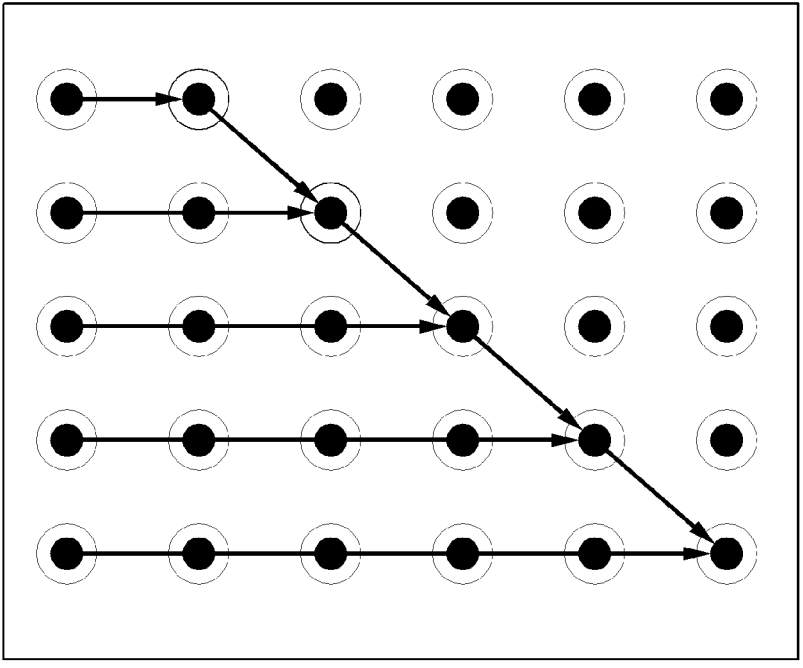
FIG. 16A is a diagram illustrating an example neural network with simple connections between the layers, according to various embodiments.
Figure 16B:
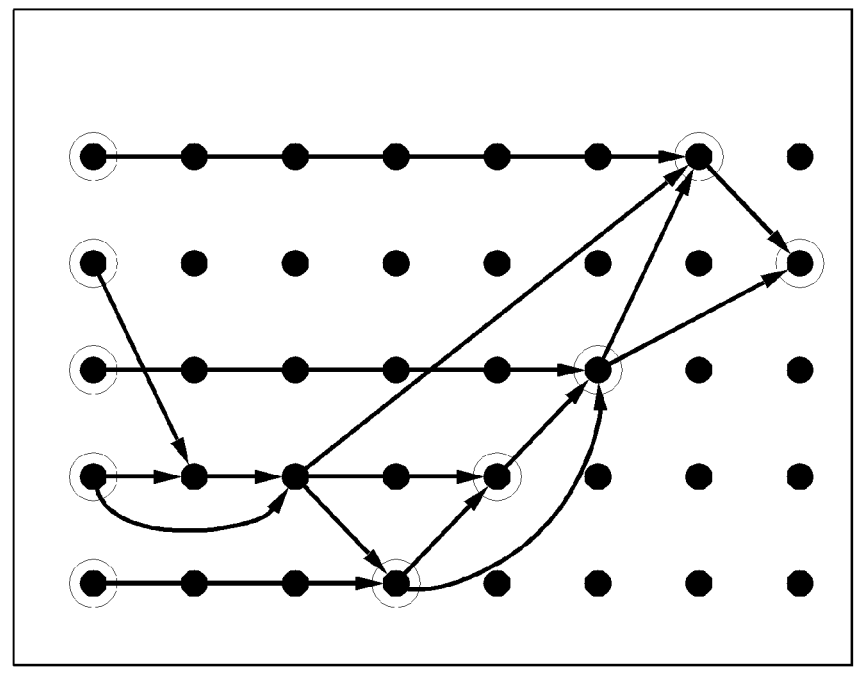
FIG. 16B is a diagram illustrating an example neural network with complex connections which reduces computational complexity due to unconventional connections, according to various embodiments.

FIG. 16A and FIG. 16B are diagrams illustrating examples of a neural network with simple and complex connections, according to various embodiments.

The neural networks are divided into two parts manually generated architecture and machine generated architecture.

In the manually generated architecture, the conventional neural network generates high computational complexity due to inflexible design and lack of control over the model architecture.

In the machine generated architecture, the RL model is able to find the analytical expression using an action and reward mechanism. The analytical expression produces low computational cost and high accuracy.

The action is removing and making new terms to the analytical expression. Reward is of two types, one is the positive reward (given when the term added in analytical expression results in higher prediction accuracy) and the other is the negative reward (given when the action taken results in lower accuracy).

Figure 17:
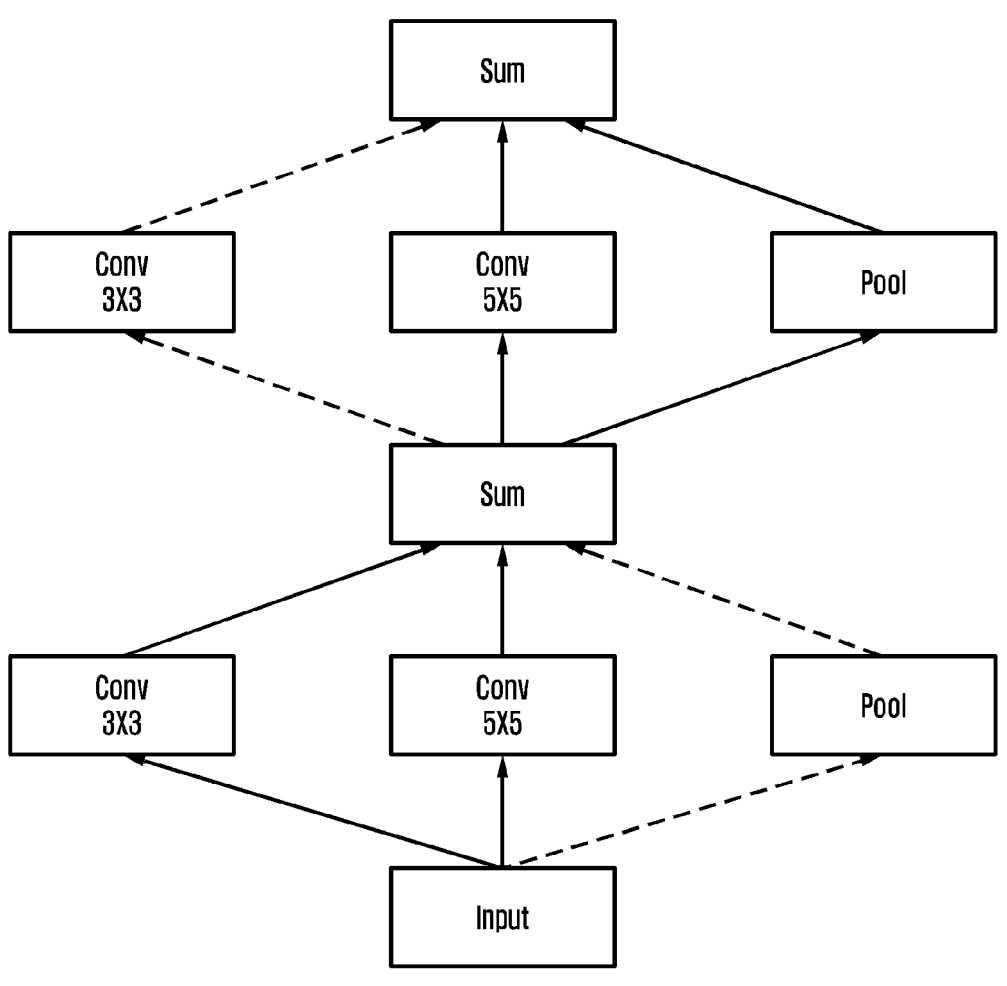
FIG. 17 is a diagram illustrating a model generator for selecting a path to perform reward calculation process, according to various embodiments.

FIG. 17 is a diagram illustrating an example of the model generator (801) for selecting a path to perform reward calculation process, according to various embodiments.

In an embodiment, a path inside a big model is a child model. The model generator (801) selects the path inside the big model and train for a few steps.

The RL model selects another path inside the big model and train for a few steps by the model generator (801), reusing the weights produced by the previous step.

The generated model is evaluated on the embedded device and the reward is calculated. The action is taken by the RL model based on the reward.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method, comprising:
   receiving, by a network server, a plurality of Key Performance Indicators (KPIs) from at least one network device in a wireless network;
   determining, by the network server, from among the plurality of KPIs a target KPIs related to at least one network anomaly using a Machine Learning (ML) model;
   determining, by the network server, a correlation of the target KPI with the plurality of KPIs for the at least one network anomaly using the ML model;
   determining, by the network server, at least one matrix as a compressed representation of a neural network trained by the network server and that indicates a relationship of the target KPI with the plurality of KPIs; and
   providing, by the network server to the at least one network device, the at least one matrix to be embedded in the at least one network device to permit the at least one network device to use the embedded matrix to optimize at least one resource of the at least one network device.

2. The method as claimed in claim 1, wherein determining, by the network server, the at least one matrix indicating a relation of the target KPI with the plurality of KPIs, includes:
   correlating, by the network server, the plurality of KPIs with the target KPI based on the at least one network anomaly;
   transmitting, by the network server, the plurality of KPIs to an Artificial Intelligence (AI) server for training; and
   receiving by the network server, the plurality of KPIs trained from the AI server.

3. The method as claimed in claim 1, wherein the at least one matrix comprises at least one of a KPI matrix and a coefficient matrix.

4. The method as claimed in claim 1, wherein the at least one resource includes plural resources, and wherein the plural resources comprises one or more of memory requirements of the at least one network device, computation requirements of the at least one network device, flops of the at least one network device, RAM requirements, GPU requirements, CPU cycles, or prediction times of the ML model of the at least one network device.

5. The method as claimed in claim 4, wherein the prediction times of the ML model of the at least one network device includes one or more of: a congestion prediction time, a handover prediction time, a MAC scheduling time, or a call mute reduction time.

6. The method as claimed in claim 1, wherein optimizing, by the network server, the at least one resource of the at least one network device based on the at least one matrix, comprises:

sending, by the network server, at least one coefficient matrix to the at least one network device; and embedding, by the network server, the at least one coefficient matrix in the at least one network device to optimize the at least one resource of the at least one network device.

7. The method as claimed in claim 1, wherein receiving, by the network server, the plurality of KPIs from at least one network device, comprises: receiving a dataset comprises plurality of KPI from the at least one network device; wherein the plurality of KPIs are related to time-series data of the at least one network device.

8. A method by a network device in a wireless network, comprising:

embedding, by the network device, at least one matrix as a representation of a neural network to optimize at least one resource of the network device, wherein the at least one matrix includes a relationship between a target KPI with a plurality of KPIs of at least one network device; and predicting, by the network device, at least one future network anomaly based on the at least one matrix embedded in the network device.

9. A network server, comprising:

a memory;

at least one processor coupled to the memory; and an optimal resource controller coupled to the memory and the processor, and configured to:

receive a plurality of Key Performance Indicators (KPIs) from at least one network device in a wireless network;

determine from among the plurality of KPIs a target KPIs related to at least one network anomaly using a Machine Learning (ML) model;

determine a correlation of the target KPI with the plurality of KPIs for at least one network anomaly using the ML model;

determine at least one matrix as a compressed representation of a neural network trained by the network server and that indicates a relationship of the target KPI with the plurality of KPIs; and providing, by the network server to the at least one network device, the at least one matrix to be embedded in the at least one network device to permit the at least one network device to use the embedded matrix to optimize at least one resource of the at least one network device.

10. The network server as claimed in claim 9, wherein determining the at least one matrix indicating a relation of the target KPI with the plurality of KPIs comprises:

correlating the plurality of KPIs with the target KPI based on the at least one network anomaly;

transmitting the plurality of KPIs to an Artificial Intelligence (AI) server for training; and receiving the plurality of KPIs that is trained from the AI server.

11. The network server as claimed in claim 9, wherein the at least one matrix comprises at least one of a KPI matrix and a coefficient matrix.

12. The network server as claimed in claim 9, wherein the at least one resource includes plural resources, and wherein the plural resources comprise one or more of memory requirements of the at least one network device, computation requirements of the at least one network device, flops of the at least one network device, RAM requirements, GPU requirements, CPU cycles, or prediction times of the ML model of the at least one network device.

13. The network server as claimed in claim 12, wherein the prediction times of the ML model of the at least one network device includes one or more of: a congestion prediction time, a handover prediction time, a MAC scheduling time, or a call mute reduction time.

14. The network server as claimed in claim 9, wherein optimizing the at least one resource of the at least one network device based on the at least one matrix, comprises:

sending at least one coefficient matrix to the at least one network device; and embedding the at least one coefficient matrix to the at least one network device to optimize the at least one resource of the at least one network device.

15. The network server as claimed in claim 9, wherein receiving the plurality of KPI from at least one network device, comprises: receiving a dataset comprises plurality of KPI from the at least one network device; wherein the plurality of KPI are related to time-series data of the at least one network device.

* * * * *